(12) United States Patent
Trousdale et al.

(10) Patent No.: US 12,123,964 B2
(45) Date of Patent: Oct. 22, 2024

(54) SYSTEMS AND METHODS FOR SPATIAL TRACKING

(71) Applicant: Proc12 Inc., Davie, FL (US)

(72) Inventors: Jonathan Trousdale, Davie, FL (US); Joseph DeCerce, Fort Lauderdale, FL (US)

(73) Assignee: Proc12 Inc., Davie, FL (US)

( * ) Notice: Subject to any disclaimer, the term of this patent is extended or adjusted under 35 U.S.C. 154(b) by 124 days.

(21) Appl. No.: 17/864,223

(22) Filed: Jul. 13, 2022

(65) Prior Publication Data

US 2023/0035854 A1 Feb. 2, 2023

Related U.S. Application Data

(60) Provisional application No. 63/221,586, filed on Jul. 14, 2021.

(51) Int. Cl.
*G01S 5/02* (2010.01)
*B25J 13/08* (2006.01)

(52) U.S. Cl.
CPC ........... *G01S 5/0258* (2020.05); *B25J 13/088* (2013.01); *G01S 5/021* (2013.01)

(58) Field of Classification Search
CPC ........ G01S 5/0258; G01S 5/021; B25J 13/088
USPC ....................................................... 342/451
See application file for complete search history.

(56) References Cited

U.S. PATENT DOCUMENTS

| 2016/0139241 A1 | 5/2016 | Holz et al. |
| 2020/0113006 A1 | 4/2020 | Bloechl et al. |
| 2020/0178054 A1* | 6/2020 | Simileysky ......... H04B 17/336 |

FOREIGN PATENT DOCUMENTS

| CN | 109579834 A | 4/2019 |
| CN | 111795691 A | 10/2020 |
| CN | 111901749 A | 11/2020 |

OTHER PUBLICATIONS

International Search Report and Written Opinion in corresponding Application No. PCT/US2022/037014, dated Oct. 21, 2022, (11 pages).

* cited by examiner

*Primary Examiner* — Harry K Liu
(74) *Attorney, Agent, or Firm* — Bookoff McAndrews, PLLC

(57) ABSTRACT

Systems and methods for spatial tracking using a hybrid signal are disclosed. A method for spatial tracking using a hybrid signal may include: receiving, from a peripheral unit and via an antenna array of a central unit, a signal that includes inertial measurement data from an inertial measurement unit (IMU) of the peripheral unit, and a constant tone extension (CTE); determining, based on the CTE, direction data for the peripheral unit; and determining, based on the direction data and the inertial measurement data, spatial tracking data for the peripheral unit.

19 Claims, 11 Drawing Sheets

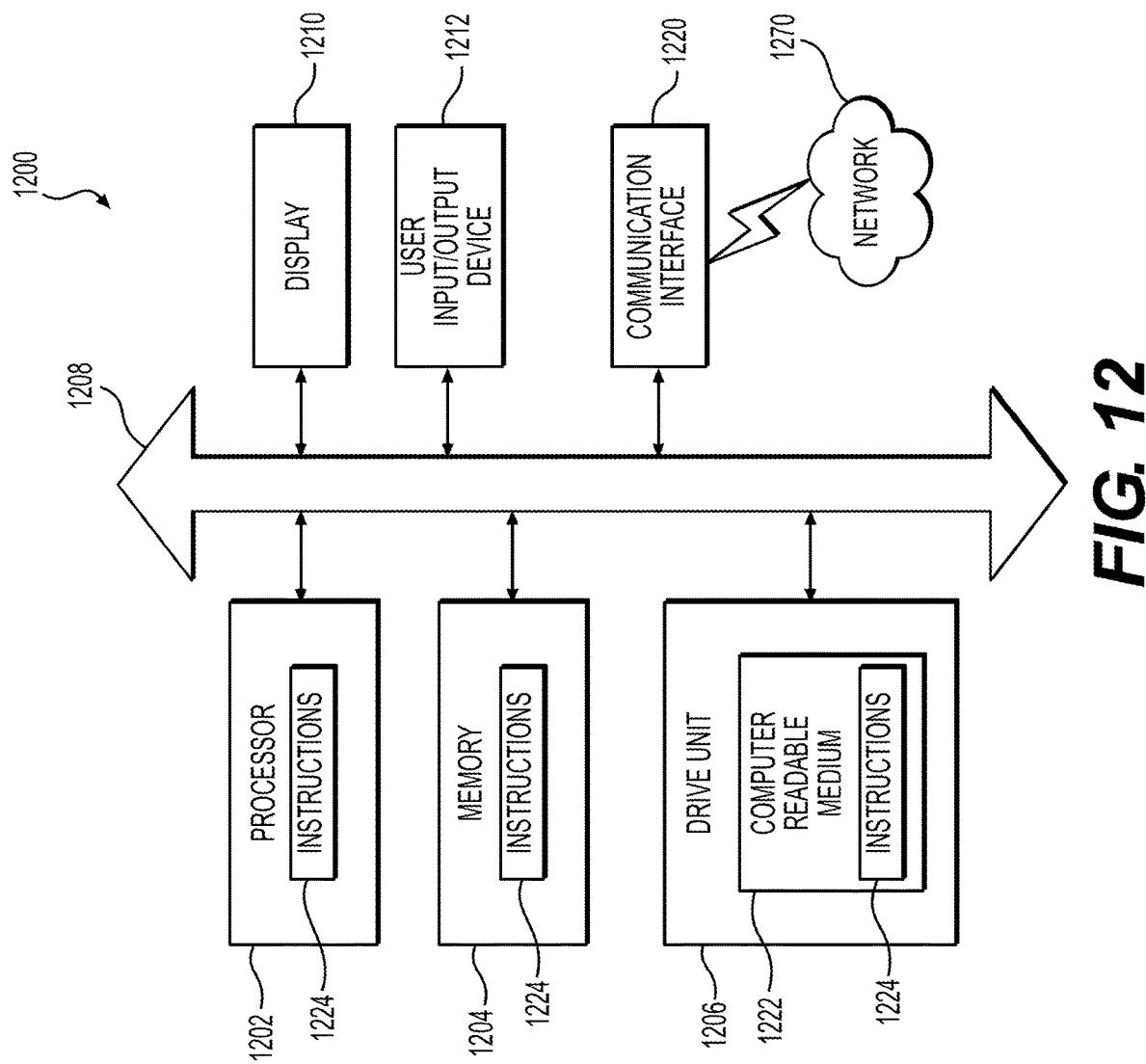

SYSTEMS AND METHODS FOR SPATIAL TRACKING

CROSS-REFERENCE TO RELATED APPLICATION(S)

This patent application claims the benefit of priority to U.S. Provisional Patent Application No. 63/221,586, filed on Jul. 14, 2021, the entirety of which is incorporated herein by reference.

TECHNICAL FIELD

The present disclosure relates generally to systems and methods to determine position and/or orientation of an object, and more particularly, to fusing inertial measurements and Bluetooth direction finding (DF) for spatial tracking.

BACKGROUND

Numerous applications may require or benefit from spatial tracking, e.g., precise tracking of the pose of a reference frame relative to one or more additional reference frames. Inertial measurement units (IMUs) may include an accelerometer and a gyroscope, and may conventionally provide a means to estimate the pose of a reference frame. IMUs are generally small, low cost, have low power requirements, and do not generally require line-of-sight relative to other devices. However, IMUs often experience biases that may be sensitive to the operating environment, noise, and/or other sources of error. IMU-only navigation systems generally use dead reckoning to estimate pose, which is generally vulnerable to the accumulation of errors over time.

To obtain estimates of position and orientation for tracking via an IMU, a form of discrete integration using linear acceleration and angular velocity, with appropriate initial conditions, may be applied to the accelerometer and gyroscope signals, respectively. While changes in orientation depend on the angular velocity of the reference frame, translational changes depend on both linear acceleration and angular velocity. The use of both linear acceleration and angular velocity signals from the accelerometer and the gyroscope, respectively, may compound the errors therefrom and/or result in an additional source of error.

Furthermore, the acceleration due to gravity, e.g., approximately 9.81 m/s$^2$ (32.2 ft/s$^2$), may result in the acceleration of gravity being significantly larger than the acceleration being measured and integrated. As a result, minute errors in tracking the direction of the gravity vector (via the gyroscope or otherwise) may obfuscate the meaningful acceleration signal. This challenge may be compounded by the fact that a double integration is generally required to achieve positional updates, resulting in a compounding of error in a way that tends to result in a second order divergence from the ground truth.

The disclosed method and system may address one or more of these problems. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, an exemplary embodiment of a computer-implemented method for spatial tracking using a hybrid signal may include: receiving, from a peripheral unit and via an antenna array of a central unit, a signal that includes inertial measurement data from an inertial measurement unit (IMU) of the peripheral unit; and a constant tone extension (CTE); determining, based on the CTE, direction data for the peripheral unit; and determining, based on the direction data and the inertial measurement data, spatial tracking data for the peripheral unit.

In another aspect, an exemplary embodiment of a system for spatial tracking using a hybrid signal may include: at least one memory storing instructions; and one or more processors operatively connected with the at least one memory, and configured to execute the instructions to perform operations. The operations may include: receiving, from a peripheral unit and via an antenna array of a central unit, a signal that includes: inertial measurement data from an IMU of the peripheral unit; and a CTE; determining, based on the CTE, direction data for the peripheral unit; and determining, based on the direction data and the inertial measurement data, spatial tracking data for the peripheral unit.

In a further aspect, an exemplary embodiment of a non-transitory computer-readable storage medium for spatial tracking using a hybrid signal may include: receiving, from a peripheral unit and via an antenna array of a central unit, a signal that includes: inertial measurement data from an IMU of the peripheral unit; and a CTE; determining, based on the CTE, direction data for the peripheral unit; and determining, based on the direction data and the inertial measurement data, spatial tracking data for the peripheral unit.

It is to be understood that both the foregoing general description and the following detailed description are exemplary and explanatory only and are not restrictive of the disclosed embodiments, as claimed. Other features and aspects of this disclosure will be apparent from the following description and the accompanying drawings.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 12 illustrates an implementation of a general computer system that may execute techniques presented herein.

DETAILED DESCRIPTION

Figure 1:
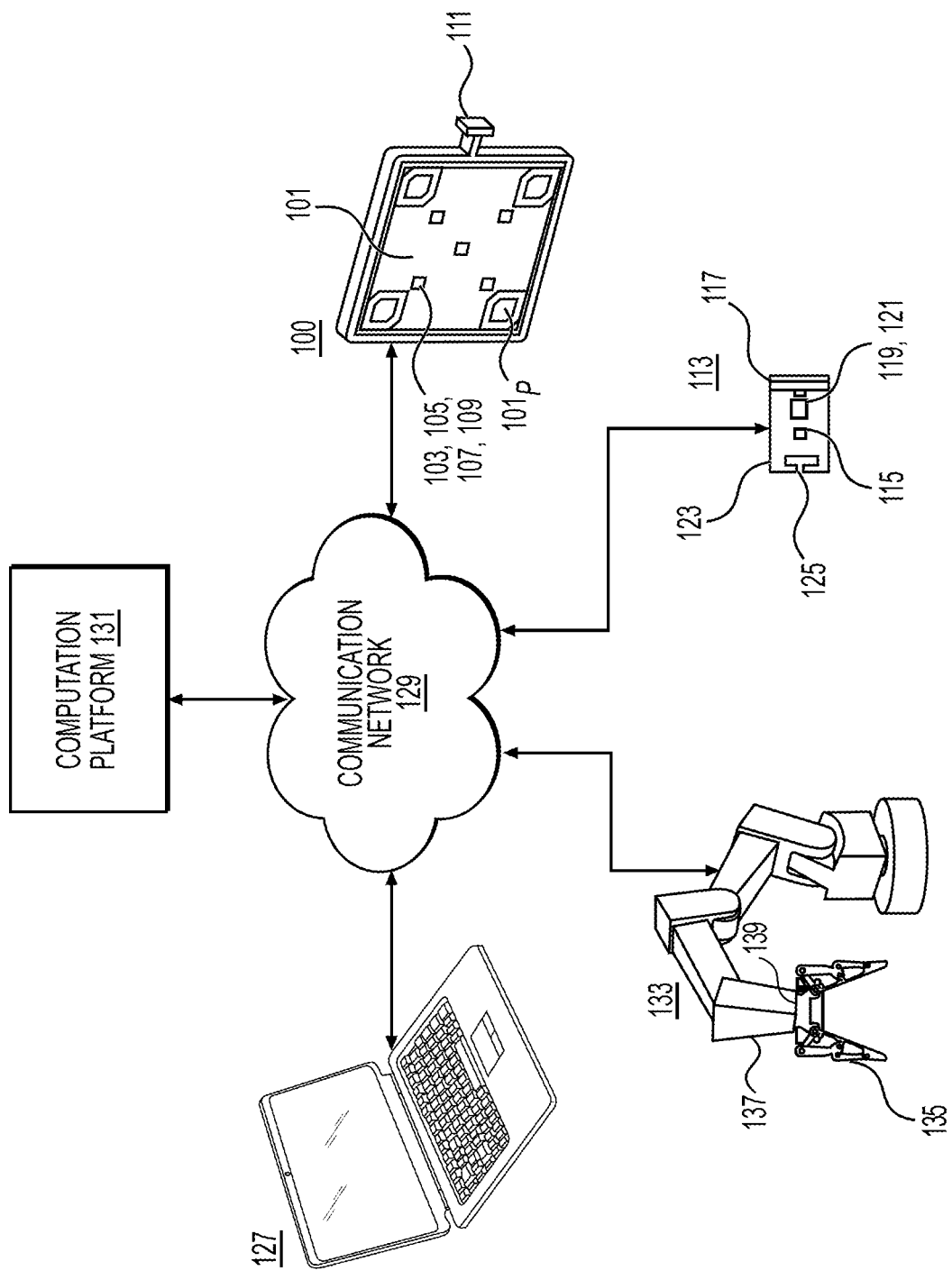
FIG. 1 illustrates a system for inertial pose estimation with dynamic error compensation, according to one or more aspects of the disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Several conventions used in the following text are provided here for clarity. The term "microprocessor" generally encompasses, without limitation, field programmable gate arrays (FPGA), application specific integrated circuits (ASIC), and central processing units (CPU). The term "pose" refers to the position and orientation of one reference frame relative to another reference frame. For exemplary reference frames W, B, C, the pose of body frame (B) with respect to world frame (W) may be denoted by a transformation $g_{wb} \equiv (\Omega_{wb}, p_{wb}) \in SE(3)$, where $\Omega_{wb} \in SO(3)$ represents the orientation of B relative to W, and $P_{wb} \in R^3$ represents the position of the origin of B relative to W. Pose $g_{wb}$ at a given time $t=\tau$ may be denoted $(g_{wb})\tau$, where t is a variable representing time and τ represents a particular value of t. The tangent space of $g_{wb}$ in W may be denoted by $V_{wb}^w \equiv (v_{wb}^w \cdot \omega_{wb}^w) \in sc(3)$, where $\omega_{wb}^w \in so(3)$ represents the instantaneous angular velocity of B as observed from W and $v_{wb}^w \in T_\omega R^3$ represents the instantaneous linear velocity of velocity vector field $v_{wb}$ at the origin of W. A vector in W defined by the difference of two points $(p_{wb} - p_{wc})$ will be denoted $v_{w(b,c)}$. Reference frames such as W, B, and C represent mathematical objects associated with points on physical rigid bodies, and transformations such as $g_{wb}$, and similar terms, represent physical configurations of such objects. Lowercase Latin subscripts and superscripts are used to refer to reference frames, as above, and lowercase Greek subscripts and superscripts are used for indices.

IMUs frequently experience non-constant biases and zero-mean noise, and when used to estimate a pose via dead reckoning, the accumulation of such errors often creates significant difficulty in maintaining the accuracy of a pose estimates over meaningful periods of time.

Thus, in some embodiments, it may be beneficial to employ a hybrid of sensor signal types, e.g., via one or more sensor fusion techniques, which may achieve improved accuracy of spatial tracking relative to conventional techniques. Sensor fusion techniques may be applied for determining a pose of any object where sensors of different modalities, e.g., IMU and Bluetooth DF, are used. In one example embodiment, one or more sensors, e.g., a peripheral unit, attached to an object that defines a body reference frame may emit various sensor data, e.g., inertial measurement data, and a constant tone extension (CTE). The emitted sensor data and CTE may be received and utilized by a central unit that defines a global reference frame. In this embodiment the inertial data provides information relating to the linear acceleration and angular velocity experienced by the peripheral unit, and the CTE facilitates a series of measurements that provide information relating to the azimuth and elevation of the peripheral unit in the global reference frame. While a CTE is discussed in this embodiment for finding azimuth and elevation, it should be understood that various types of suitable signals may be used in various embodiments. The central unit may interact or be integrated with a device, e.g., an interface unit, that implements a sensor fusion technique utilizing the local inertial information together with the global directional information to spatially track the object.

Such sensor fusion techniques may be applied in a wide variety of applications, such as a medical or surgical environment to provide an improved position or orientation estimate of patient anatomy and/or medical instruments used during a medical or surgical procedure. Other exemplary application include manufacturing, (e.g., tracking and/or control of persons or devices used in a manufacturing process), video games (e.g., tracking a controller or limb to control rendering or movement of a virtual object), virtual and augmented reality (e.g. tracking a user's anatomy, or tracking another real object that has a virtual representation in a virtual space), vehicle control, etc. Examples of techniques for fusing outputs from tracking sensors, e.g., accelerometer, gyroscope, Bluetooth DF, to reduce pose estimation error are described herein.

FIG. 1 illustrates an exemplary embodiment of a system for inertial pose estimation, in accordance with one or more aspects of this disclosure. The embodiment of the system in FIG. 1 may include a central unit 100, a peripheral unit 113, a computation platform 131, and an interface unit 127, which may communicate over a communication network 129.

In the illustrated embodiment, central unit 100 may include antenna array 101, a radio 103, a microprocessor 105, an inertial measurement unit (IMU) 107, and a radio frequency (RF) switch 109. The antenna array 101 may define a global reference frame W and may have a plurality of antennas $101_p$, each of which may define a local antenna frame ($N_p$). Antennas $101_p$ may be rigidly fixed relative to W such that $g_{wn_p}$ are fixed and determined prior to use. One or more antennas 101 may also be configured to communicate with peripheral unit 113.

In one embodiment, radio 103 may be a Bluetooth low energy (BLE) radio that may be configured to continuously transmit and/or scan for BLE advertising messages to establish connectivity with other BLE devices and/or services to enable data exchange, e.g., transmit processed data. Radio 103 may provide considerably reduced power consumption while searching for and discovering corresponding BLE devices, and may be engaged continually without rapidly draining device battery. In another embodiment, radio 103 may also discover non-BLE wireless platforms and services, as using the BLE service discovery for other wireless communication modes residing on the same platform may result in significant power saving. In a further embodiment, radio 103 may be a software-defined radio that may be configured using software(s) to handle any number of different communication standards, including custom or otherwise non-standards-driven wireless communications.

In one embodiment, microprocessor 105 may control the operation of central unit 100. Microprocessor 105 may be a computer processor where the data processing logic and control is included on a single integrated circuit (IC) or a small number of integrated circuits. Microprocessor 105 may include arithmetic unit, logic unit, control unit, and memory unit to perform the functions of a central processing unit (CPU) of a computer.

The radio 103 and microprocessor 105 may, for example, be packaged together as a system on a chip (SOC), e.g. a Nordic® Semiconductor nRF52833. RF switch 109 may be connected between radio 103 and antenna array 101 to facilitate serial reception and transmission using two or more antennas 10l, during operations calling for access to more than one antenna 101. In one embodiment, RF switch 109 may route radio frequency signals between various inputs and outputs. RF switches may be classified based on the switching action, e.g., electromechanical switches, solid state switches, etc. In one instance, electromechanical switches may have metal contacts which may either be physically open to prevent current or signal flow or closed to allow current flow. In another instance, solid state switches implement semiconductor technology, e.g., PIN diodes, field effect transistor (FET), hybrid switches, etc., to selectively open and close circuits.

IMU 107 may be utilized to confirm that W is stationary relative to the Earth, within a predetermined threshold. In other embodiments, e.g., in an embodiment in which the central unit 100 is assumed to be stationary relative to the Earth, the central unit 100 may not include an IMU.

In the embodiment illustrated in FIG. 1, peripheral unit 113 may contain IMU 115, which may define a body reference frame B, with origin at the intersection of three independent accelerometer basis vectors, and may measure the local acceleration and angular velocity of B. Peripheral unit 113 may also contain antenna 117, radio 119, and microprocessor 121, which may facilitate processing and transmission of inertial measurement data from peripheral unit 113 to central unit 100. Antenna 101 may define frame D which may be fixed relative to B such that $g_{db}$ is fixed and determined prior to use. In one embodiment, the origin of D is a phase center of antenna 101. One or more components of peripheral unit 113 may be contained in housing 123, which may include coupling feature 125. Coupling feature 125 may define coupling frame (C), and IMU 115 may be rigidly fixed relative to coupling feature 125 such that $g_{cb}$ is fixed and determined prior to use. Mount 111 may define a mount frame (T) that may be rigidly fixed relative to antenna 117, such that $g_{wt}$ is fixed and determined prior to use, and is configured to engage coupling feature 125 in a predetermined pose, such that $g_{tc}$ is fixed and determined prior to use, and such that an initial transformation $(g_{wb})$ $0 = g_{wt} g_{tc} g_{cb}$ is determined during an initialization step, as discussed in more detail below. In one embodiment, the transformations that are fixed and determined prior to use are determined on a manufacturing line as step in a manufacturing process.

In one embodiment, peripheral unit 113 may be fixedly secured to the inner structure of object 133 or removably attached to the outer frame of object 133. In one example embodiment, object 133 may comprise end effector 135 coupled to forearm 137 by way of wrist joint 139, e.g., a differential joint. The differential joint may permit end effector 135 to be rotated anywhere within a partial sphere and/or to be positioned with respect to forearm 137 in any position within the partial sphere. As discussed in further detail below, peripheral unit 113 may transmit, in real-time or near time, inertial measurement data and CTE to facilitate estimation of the orientation, position, and/or velocity of end effector 135 and/or forearm 137, and central unit 100 may receive, in real-time or near real-time, inertial measurement data and CTE from peripheral unit 113. And, as also discussed in further detail below, central unit 100 may implement sensor fusion techniques to fuse the inertial measurement information and DF information to determine elevation, azimuth, and/or direction to spatially track end effector 135 and forearm 137.

Central unit 100 may be in communication with interface unit 127, which may interface with a user, e.g., a human, and may be configured to utilize information relating to $g_{wb}$ for various purposes. In one embodiment, interface unit 127 may include, but is not restricted to, a mobile handset, a wireless communication device, a station, a unit, a device, a multimedia computer, an Internet node, a communicator, a desktop computer, a laptop computer, a notebook computer, a netbook computer, a tablet computer, a Personal Communication System (PCS) device, a personal navigation device, a Personal Digital Assistant (PDA), an infotainment system, a dashboard computer, a television device, or any combination thereof, including the accessories and peripherals of these devices, or any combination thereof. Any known and future implementations of interface unit 127 may also be applicable. In one embodiment, interface unit 127 and central unit 100 may both contain distinct microprocessors. In an alternate embodiment, interface unit 127 and central unit 100 are integrated and utilize at least one microprocessor in common. In an example, interface unit 127 may utilize the information relating to the spatial tracking of peripheral unit 113 for any suitable purpose such as, for example, performing and/or ensuring accuracy of a motion of the object 133, relating motion of the object 133 to a virtually rendered object, etc.

Communication network 129 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5$^{th}$ Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In one example embodiment, peripheral unit 113 may transmit a BLE advertising message over a Bluetooth communication network 129 to establish connectivity with central unit 100. Central unit 100 may detect the BLE advertising message and may establish a connection with peripheral unit 113 to enable data transfer. It should be understood that different devices in FIG. 1 may use different networks or communications protocols to communicate, for example, the peripheral unit 113 may be in communication with the central unit 100 via the Bluetooth communication network 129, while the central unit 100 may be in communication with the interface unit 127 and/or the computation platform 131 via a wired or wireless internet connection, or the like.

In one embodiment, computation platform 131 may be a platform with multiple interconnected components. Computation platform 131 may include one or more servers, intelligent networking devices, computing devices, components, and corresponding software for fusing different signal types for spatial tracking. In addition, it is noted that, in various embodiments, computation platform 131 may be a separate entity of FIG. 1 or a part of central unit 100, peripheral unit 113, and/or interface unit 127. Any known or still developing methods, techniques, or processes for fusing different signal types for spatial tracking may be employed by computation platform 131.

In one instance, to reduce biases in IMU 107 and/or IMU 115, coupling feature 125 of peripheral unit 113 may be attached to an object that is fixed relative to W. In one embodiment, computation platform 131 may perform a computational coupling of IMU signals to reduce IMU bias, e.g., accelerometer signals may be compared to determine a reference with respect to the direction of gravity and gyroscope signals may be compared relative to some zero or non-zero reference angular velocity.

In one embodiment, computation platform 131 may be configured to receive and fuse inertial measurement data and Bluetooth DF data. For example, computation platform 131 may receive input data of various types from various sensors of central unit 100 and peripheral unit 113. In one embodiment, peripheral unit 113 may transmit a signal pertaining to the pose of an object. A portion of the transmitted signal, may include a direction-finding signal such as a CTE signal that is an un-whitened signal representing a series of binary is. Computation platform 131 may fuse direction data determined via Bluetooth DF with the position and orientation data determined via the inertial measurement data to determine an estimation of the pose of the object. In one example, the computation platform 131 may determine the estimation of the pose by inputting DF information and inertial information into a recurrent neural network (RNN) with long short-term memory (LSTM). In another example, the computation platform 131 may apply one or more algorithms to the DF data and the inertial data to determine the estimation of the pose.

In one embodiment, computation platform 131 may estimate the error states for an object's pose by utilizing models for how the object is expected behave, e.g., based on physical models, etc., and compare these models to the actual measurements from the sensors, e.g., inertial and DF. Computation platform 131 may use the differences between the model and the measurements to provide a better estimate of the object's pose. In another embodiment, computation platform 131 may predict an estimate of the current state of the object's pose and compare this state to the data from the sensors being fused, e.g., inertial and DF, to generate the error states. Accordingly, computation platform 131 may determine the object's pose in W. Further aspects of the operations performed by the computation platform 131 for fusing sensor data and/or determining an estimation of a pose are discussed below.

Figure 2:
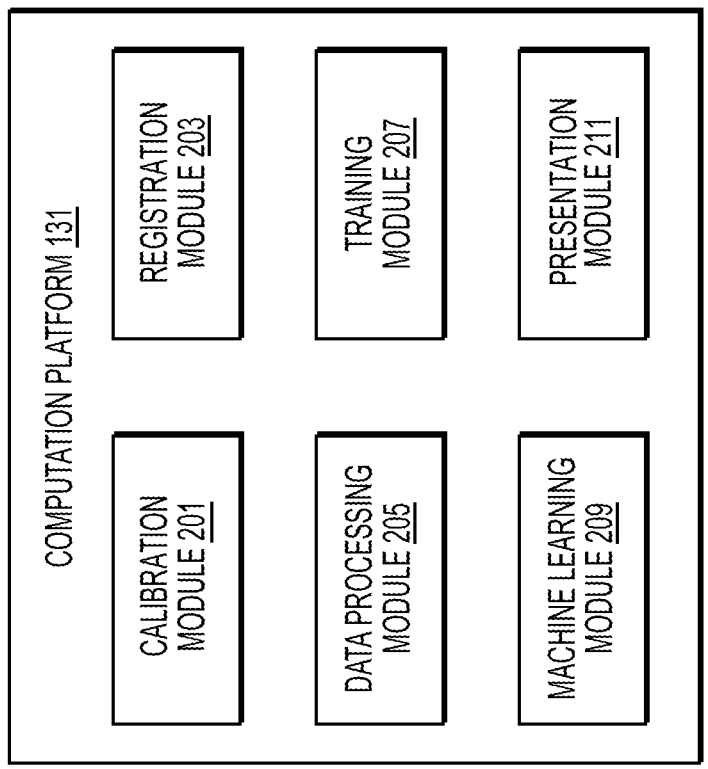
FIG. 2 is a diagram of the components of computation platform 131, according to one or more aspects of the disclosure.

FIG. 2 is a diagram of the components of computation platform 131, according to one example embodiment. As used herein, terms such as "component" or "module" generally encompass hardware and/or software, e.g., that a processor or the like may use to implement associated functionality. By way of example, computation platform 131 includes one or more components for fusing different signal types for spatial tracking. It is contemplated that the functions of these components may be combined in one or more components or performed by other components of equivalent functionality. In one instance, computation platform 131 comprises calibration module 201, registration module 203, data processing module 205, training module 207, machine learning module 209, and presentation module 211, or any combination thereof.

In one embodiment, calibration module 201 may include one or more calibration algorithms that utilize first order, affine calibrations to calibrate an accelerometer and a gyroscope. In one embodiment, during accelerometer calibration, calibration module 201 may controls a robot to position IMU 115 in five distinct points of constant gravitational acceleration to generate a 3×4 calibration matrix and an estimate of the gravity vector in the robotic coordinate system. In an exemplary embodiment, the robot is an ABB IRB 1200-7/0.7, and these five points in robotic joint space are as follows:

$j_0=(0.0.0.-35.2644.135), j_1=(0.0.0.0.135), j_2=(0.0.0.0.-45.90), j_3=(0.0.0.0.-45.180), j_4=(0.0.0.0.35.2644.-45)$.

With an initial assumption that the gravity vector is in the +z direction of the robotic coordinate system, the above joint space coordinates correspond, respectively, to unit gravity vectors of:

$$a_0 = \left(\frac{1}{\sqrt{3}} \cdot \frac{1}{\sqrt{3}} \cdot \frac{1}{\sqrt{3}}\right)^T \cdot a_1 = \left(\frac{1}{\sqrt{2}}, \frac{1}{\sqrt{2}}, 0\right)^T \cdot a_2 = \left(0, \frac{1}{\sqrt{2}}, \frac{1}{\sqrt{2}}\right)^T,$$

$$a_3\left(\frac{1}{\sqrt{2}}, 0 \cdot \frac{1}{\sqrt{2}}\right)^T \cdot a_4 = \left(-\frac{1}{\sqrt{3}}, -\frac{1}{\sqrt{3}} \cdot -\frac{1}{\sqrt{3}}\right)^T.$$

The four $r_n \in SO(3)$ rotations, such that $\alpha_n = r_n(\alpha_{n-1})$, are given by:

$$r_1 = \begin{bmatrix} \frac{1}{6-2\sqrt{6}} & \frac{1}{6-2\sqrt{6}}-1 & \frac{1}{\sqrt{6}} \\ \frac{1}{6-2\sqrt{6}}-1 & \frac{1}{6-2\sqrt{6}} & \frac{1}{\sqrt{6}} \\ -\frac{1}{\sqrt{6}} & -\frac{1}{\sqrt{6}} & \frac{\sqrt{2}}{\sqrt{3}} \end{bmatrix}$$

$$r_2 = \begin{bmatrix} \frac{2}{3} & -\frac{2}{3} & -\frac{1}{3} \\ \frac{1}{3} & \frac{2}{3} & -\frac{2}{3} \\ \frac{2}{3} & \frac{1}{3} & \frac{2}{3} \end{bmatrix}$$

$$r_3 = \begin{bmatrix} \frac{2}{3} & \frac{2}{3} & \frac{1}{3} \\ -\frac{1}{3} & \frac{2}{3} & -\frac{2}{3} \\ -\frac{2}{3} & \frac{1}{3} & \frac{2}{3} \end{bmatrix}$$

-continued
$$r_4 = \begin{bmatrix} 1 - \frac{1}{6-2\sqrt{6}} & \frac{1}{\sqrt{6}} & -\frac{1}{6-2\sqrt{6}} \\ -\frac{1}{\sqrt{6}} & -\frac{\sqrt{2}}{\sqrt{3}} & -\frac{1}{\sqrt{6}} \\ -\frac{1}{6-2\sqrt{6}} & \frac{1}{\sqrt{6}} & 1-\frac{1}{6-2\sqrt{6}} \end{bmatrix}$$

During the calibration sequence, the robot may be set to the joint space coordinates noted above, accelerations reported by the subject IMU are measured and the mean of those measurements is calculated. In one instance, the mean vector of the reported acceleration vectors corresponding to $\alpha_n$ as $\alpha_n \in \mathbb{R}^3$, the 4×4 matrix may be defined as:

$$A \equiv \begin{bmatrix} a_1 & a_2 & a_3 & a_4 \\ -1 & -1 & -1 & -1 \end{bmatrix}$$

with units in counts, and the 3×4 matrix:

$$V \equiv [\alpha_1 \cdot \alpha_2 \cdot \alpha_3 \cdot \alpha_4]$$

with units of G's. An initial estimate of the affine calibration matrix for the accelerometer, $C_a$, is denoted by:

$$C_\alpha = VA^{-1}$$

with units of G's per count. $C_\alpha$ may be used to get an improved normalized gravity vector go by:

$$g_0 = \frac{C_a a_0}{|C_a a_0|},$$

which gives an updated $\tilde{V}$ by:

$$\tilde{V} = [r_1 g_0 r_2 r_1 g_0 r_2 r_1 g_0 r_4 r_3 r_2 r_1 g_0]$$

and an improved affine calibration matrix for the accelerometer by:

$$\tilde{C}_\alpha = \tilde{V} A^{-1}$$

In one embodiment, calibration module 201 may repeatedly iterate this process to improve both the estimate of the gravity vector in the robotic reference frame and $C_\alpha$.

In one embodiment, calibration module 201 may include one or more algorithms that perform gyroscope calibration in a similar method. Hence, four points of known constant angular velocity may be used. In one example embodiment, a robotic motion may be set to provide angular velocity of 50 degrees/sec, and the four motions in joint space are (±indicating a movement of that joint from a positive angle to a negative angle, and vice versa):

$j_1 = (0.0.0.\pm240.90.135), j_2 = (0.0.0.\pm240.45.90), j_3 = (0.0.0.\pm240.45.180), j_4 = (0.0.0.\pm240.-54.7356.-45).$

These movements generate angular velocities with the same unit vectors as the an above. Analogous to the process above, define the 3×4 matrix:

$$U = 50V$$

with units deg/sec, and the mean vector of the reported angular velocity vectors corresponding to $\alpha_n$ as $\omega_n \in \mathbb{R}^3$, giving the 4×4 matrix:

$$\Omega \equiv \begin{bmatrix} \omega_1 & \omega_2 & \omega_3 & \omega_4 \\ -1 & -1 & -1 & -1 \end{bmatrix}.$$

The resulting 3×4 affine calibration matrix for the gyroscope is then given by:

$$C_\omega = U\Omega^{-1}$$

If the rotation of the Earth can be approximated as zero, no assumption analogous to the direction of the gravity vector is required for angular velocities, so the iterative steps and the fifth calibration vector may not be required for the gyroscope calibration. If the rotation of the Earth cannot be approximated as zero, analogous iterative steps and a fifth calibration vector can be employed to estimate the angular velocity associated with the Earth's rotation about its axis.

In one embodiment, registration module 203 may include one or more algorithms that map a coordinate system to a unit 3-sphere ($S^3$) in elliptic space. In one instance, $S^3$ may be the largest unit sphere in four-dimensional space and elliptic space may be a spherical space with antipodal points identified. In other words, elliptic space may be the space of diameters of a sphere. This is a natural topology of unit quaternions mod $Z_2$, which corresponds to rotations in 3-dimensional space.

In one example embodiment, during a hip registration technique, registration module 203 may define the mediolateral axis (generally ASIS-ASIS), which may be associated with the identity (qo=1 at t=0). The registration module 203 may then define the anterior pelvic plane (APP) by the mediolateral axis and a second line connecting the ASIS to the pubic symphysis ($q_\tau = \alpha_\tau + b_\tau i + c_\tau j + d_\tau k$ at $t=\tau$). These measurements may be translationally invariant, and the registration is relative to lines since the relevant geometry is that of diameters of a sphere in elliptic space.

In one instance, in four-dimensional elliptic space, the line representing a primary axis may be represented by a circle, i.e., a rotation about the axis of the registration tool, which must be projected to a point. This may be achieved by defining two angles (at arbitrary time step t=j).

$$\gamma_j = 2\arccos\left(\sqrt{a_j^2 + b_j^2}\right)$$

$$\chi_j = -i\left(\log\left(2\frac{a_j + id_j}{|a_j + id_j|}\right) - \log\left(2\frac{b_j + ic_j}{|b_j + ic_j|}\right)\right)$$

In one instance, the choice of coefficients in this calculation may be tied to the conventions adopted in the calibration sequence outlined above. The angle $\gamma$ may be closely associated with inclination, and the angle $\chi$ may be closely associated with version, as discussed below.

In one instance, each IMU update may provide a measurement (in counts) of the instantaneous angular velocity of a system at a given time (call it $\varpi \in \mathbb{R}^3$). This signal may be corrected and converted to degrees per second using the calibration matrix according to $$\omega = C_\omega \begin{pmatrix} \varpi \\ -1 \end{pmatrix}$$

where $C_w$ is from one of the above equations. This instantaneous angular velocity together with the amount of time since the previous measurement ($\delta t$) provides a unitary transformation matrix (defining $\omega \equiv \sqrt{\Sigma \omega_n^2}$ and the three normalized components of $\omega$ according to $\bar{\omega} = \omega(\omega 1, \omega 2, \omega 3)^T$).

$$SU(2) \ni s_t = \begin{bmatrix} \cos\left(\frac{1}{2}\bar{\omega}\delta t\right) - i\omega_3 \sin\left(\frac{1}{2}\bar{\omega}\delta t\right) & (\omega_2 - i\omega_1)\sin\left(\frac{1}{2}\bar{\omega}\delta t\right) \\ -(\omega_2 + i\omega_1)\sin\left(\frac{1}{2}\bar{\omega}\delta t\right) & \cos\left(\frac{1}{2}\bar{\omega}\delta t\right) + i\omega_3 \sin\left(\frac{1}{2}\bar{\omega}\delta t\right) \end{bmatrix}$$

which represents the rotation of the system during $\delta t$. If $S_t \in SU(2)$ is a unitary transformation matrix that represents the aggregate transformation from time 0 to t. This matrix is updated at each time interval by left multiplication according to:

$$S_{t+1} = s_t S_t,$$

which effects the discrete integration. The components of $S_t$ map to the components of a quaternion by (taking $q = a + bi + cj + dk$), wherein:

$$a = Rc(S(1.1)).\ b = -Jm(S(2.1)).\ c = -Rc(S(2.1)).\ d = -Jm(S(1.1)).$$

When a second tracker is fixed to the pelvis to track the anatomy, the same discrete integration process above is repeated for the tracking IMU and the entire system is simply rotated by the anatomy IMU's deviation from the identity.

In one embodiment, the computation platform 131 may include or have access to an RNN, and data processing module 205 may be configured to fuse a Bluetooth DF signal with inertial measurement data using the RNN. In one instance, the RNN may fuse the two data streams in a very high dimensional space that may account for nonlinearities that would be impossible for an affine calibration to account for, and extremely difficult for conventional higher order calibration techniques. In one instance, data processing module 205 may utilize RNN with LSTM, a common implementation for RNNs with time-series inputs and outputs. Data processing module 205 may implement a twelve-dimensional input vector ($X^{(t)}$) at each time step:

$$X^{(t)} = \begin{pmatrix} \delta t \\ \Theta \\ \Phi \\ a_1 \\ a_2 \\ a_3 \\ \omega_1 \\ \omega_2 \\ \omega_3 \\ b \\ c \\ d \end{pmatrix}$$

In the twelve-dimensional input vector ($X^{(t)}$), $\Theta$ and $\Phi$ are elevation and azimuth outputs from the DF subsystem normalized as rad/$\pi$; $\alpha_n$ and $\omega_n$ are accelerometer and gyroscope raw counts converted to integers and normalized (two's compliment of output binary, divided by $2^{14}$); and b, c, d correspond to the vector component of the quaternion representing aggregate rotation, in each case at time t. In other words, the input vector includes a fusion of raw DF data, processed DF data, and inertial measurement data. While a particular example of a format for such data is discussed above, it should be understood that any suitable format that may be used as input for the RNN may be used.

In one embodiment, training module 207 may provide a supervised machine learning module 209 by providing training data, e.g., direction data, inertial measurement data, and spatial data, that contains input and correct output, to allow machine learning module 209 to learn over time. The training may be performed based on the deviation of a processed result from a documented result when the inputs are fed into machine learning module 209, e.g., algorithm measures its accuracy through the loss function, adjusting until the error has been sufficiently minimized. Training module 207 may conduct the training in any suitable manner, e.g., in batches, and may include any suitable training methodology. Training may be performed periodically, and/or continuously, e.g., in real-time or near real-time.

Although one or more examples above pertain to using an RNN, in various embodiments, machine learning module 209 may implement a machine learning technique such as decision tree learning, association rule learning, neural network (e.g., recurrent neural networks, convolutional neural networks, deep neural networks), inductive programming logic, support vector machines, Bayesian models, etc., to receive as input the training data from training module 207. Machine learning module 209 may leverage one or more classification models trained to classify the training data and/or one or more prediction models trained to predict an outcome based on the training data. For example, machine learning module 209 may input the training data to classification models and/or prediction models to determine changes in direction data and inertial measurement data. Machine learning module 209 may use outcomes associated with the predictions or classifications to reinforce/retrain the models. Accordingly, machine learning module 209 may generate spatial tracking data based on the training data. In one embodiment, machine learning module 209 may use direction data and inertial measurement data to configure central unit 100, peripheral unit 113, and interface unit 127.

In one example embodiment, in an AR environment, a controller is typically held in the user's hand, and therefore the distance between the controller and the AR headset typically does not exceed approximately the length of the user's arm. Machine learning module 209 may implement an error protocol that checks whether the estimated distance between the controller and the AR headset exceeds a threshold distance, e.g., comparable to a typical human arm length. If the distance exceeds the threshold distance, machine learning module 209 may determine that an error has likely occurred. If an error is detected, machine learning module 209 may take corrective actions such as, for example, re-initializing the system.

In one instance, presentation module 211 may enable a presentation of a graphical user interface (GUI) in interface unit 127. The presentation module 211 may employ various APIs or other function calls corresponding to the applications on interface unit 127, thus enabling the display of graphics pertaining to the position, orientation, and/or velocity of an object. In one instance, presentation module 211 may cause interfacing of information with the users to include, at least in part, one or more annotations, text messages, audio messages, video messages, or a combination thereof. For example, presentation module 211 may cause an audio/visual presentation in interface unit 127 to depict the position or orientation of an object determined by data processing module 205. In another instance, presentation module 211 may include a data access interface configured to allow users to access, configure, modify, store, and/or download information to interface unit 127 or any other type of data device.

The above presented modules and components of computation platform 131 may be implemented in hardware, firmware, software, or a combination thereof. Though depicted as a separate entity in FIG. 2, it is contemplated that computation platform 131 may be implemented for direct operation by respective interface unit 127. The various executions presented herein contemplate any and all arrangements and models.

Figure 3:
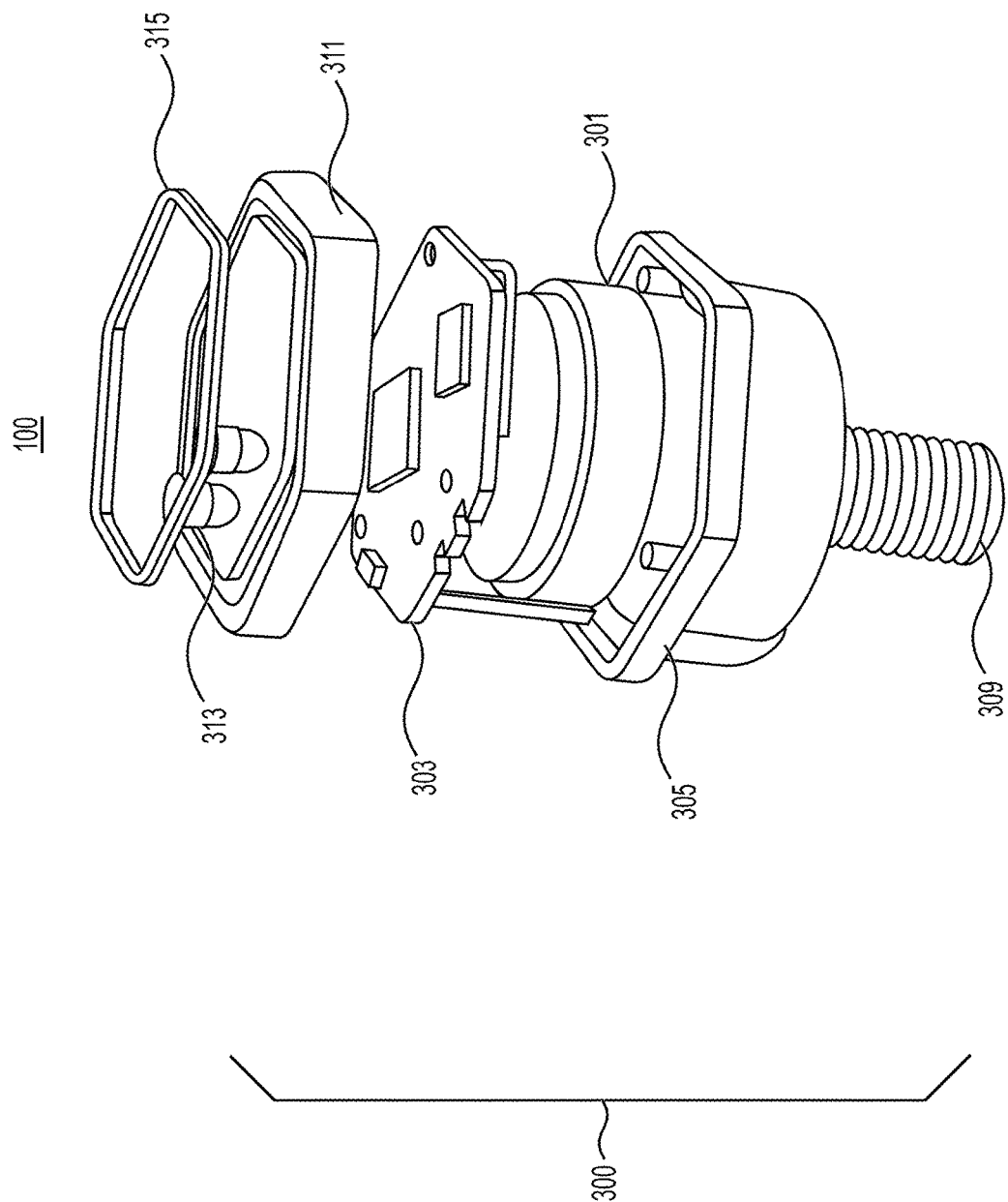
FIG. 3 illustrates an exploded view of an exemplary peripheral unit of FIG. 1, according to one or more aspects of the present disclosure.

FIG. 3 illustrates an exploded view of an exemplary peripheral unit 113 of FIG. 1, according to aspects of the present disclosure. In one embodiment, peripheral unit 113 may include rechargeable battery 301 and printed circuit board (PCB) 303 disposed within housing 300. For example, housing bottom 305 may define a cavity sized, shaped, and/or otherwise configured to receive one or more internal components of peripheral unit 113, such as, rechargeable battery 301 and PCB 303. In some embodiments, housing bottom 305 may include engagement mechanisms that are configured to mate with corresponding engagement mechanisms of housing top 307. Although not shown, it should be appreciated that additional and/or fewer engagement mechanisms may be positioned along additional and/or fewer surfaces or walls of housing bottom 305 and housing top 307 without departing from the scope of this disclosure.

Engagement mechanisms may include various suitable features for coupling housing bottom 305 and housing top 307, for example, a magnet, an adhesive, a clip, a clasp, a tab, a hook, a raised or recessed surface, and more. In one instance, housing bottom 305 may secure rechargeable battery 301 and PCB 303 before soldering the antenna and/or bonding the top housing. The base of housing bottom 305 may also include a patterned protrusion 309, e.g., designed with an m4×0.4 millimeters (mm) thread, that is configured to screw easily into a pre-drilled hole, e.g., a 3 mm pre-drilled hole, or snap onto tracker pins or tool connectors.

In one embodiment, rechargeable battery 301 may include, but is not limited to, a ferric or lithium-ion battery, a nickel-cadmium battery, a nickel-metal hydride battery, and more. In another embodiment, rechargeable battery 301 may comprise a plurality of rechargeable batteries that are coupled together in series within housing 300. Although shown as having a circular shape, rechargeable battery 301 may have various other shapes without departing from the scope of this disclosure. By way of example, rechargeable battery 301 may have a rectangular, a square, a cylindrical, a triangular, a pentagonal, and various other cross-sectional profiles.

In one embodiment, rechargeable battery 301 and PCB 303 may be integrally attached to one another by electrical connectors, e.g. wires, such that PCB 303 may operate using electrical power stored in rechargeable battery 301. Although PCB 303 is placed on top of rechargeable battery 301, it is understood that PCB 303 may be positioned in any other configuration.

In one embodiment, PCB 303 may include a substrate on which conductive traces are positioned. At locations on the conductive traces, connection mounting pads are exposed to allow the attachment of electronic devices, such as integrated circuits. A top layer of PCB 303 is commonly a solder mask, i.e., a thin layer of material that is resistant to wetting by the solder. The solder mask exposes the connection mounting pads through holes in the solder mask. The conductive trace then extends above the level of the solder mask. In one example embodiment, PCB 303 may be a 4-layer Rigid PCB with 0.5 mm thickness that may include pads for charging pogo pins that make contact during assembly and plated holes for easy battery tab attachment. An antenna is soldered to the pads near a Bluetooth radio and a matching circuit. It should be appreciated that the number of layers for PCB 303 is selected for simplicity of illustration and may be assembled in various other configurations.

In one embodiment, housing top 307 may include at least one aperture in the surface for exposing recharge pogo pins 313 that contacts the pad on PCB 303. In one instance, recharge pogo pins 313 may allow peripheral unit 113 to be recharged externally. It is understood that the configuration of recharge pogo pins 313 may be adapted to connect peripheral unit 113 with one of a number of electrical contacts.

In one embodiment, Bluetooth antenna 315 may be arranged on housing top 307. In one instance, housing top 307 may include patterns, depressions, e.g., concave dimples, to receive and secure Bluetooth antenna 315. Bluetooth antenna 315 may be formed of a magnetic wire, a flex PCB, a punched metal, or any other suitable materials. In one instance, Bluetooth antenna 315 may be an external quarter-wave loop antenna configured for maximum distance from ground planes and metal components that block the Bluetooth signal. The length of Bluetooth antenna 315 is relevant with its frequency of operation, for example, Bluetooth antenna 315 may be 31.5 mm long and may be tuned with a matching circuit on PCB 303. Bluetooth antenna 315 may be coated with suitable materials to reduce impedance changes from touch/fluids. It is understood that the configuration of Bluetooth antenna 315 may vary per requirement.

Figure 4:
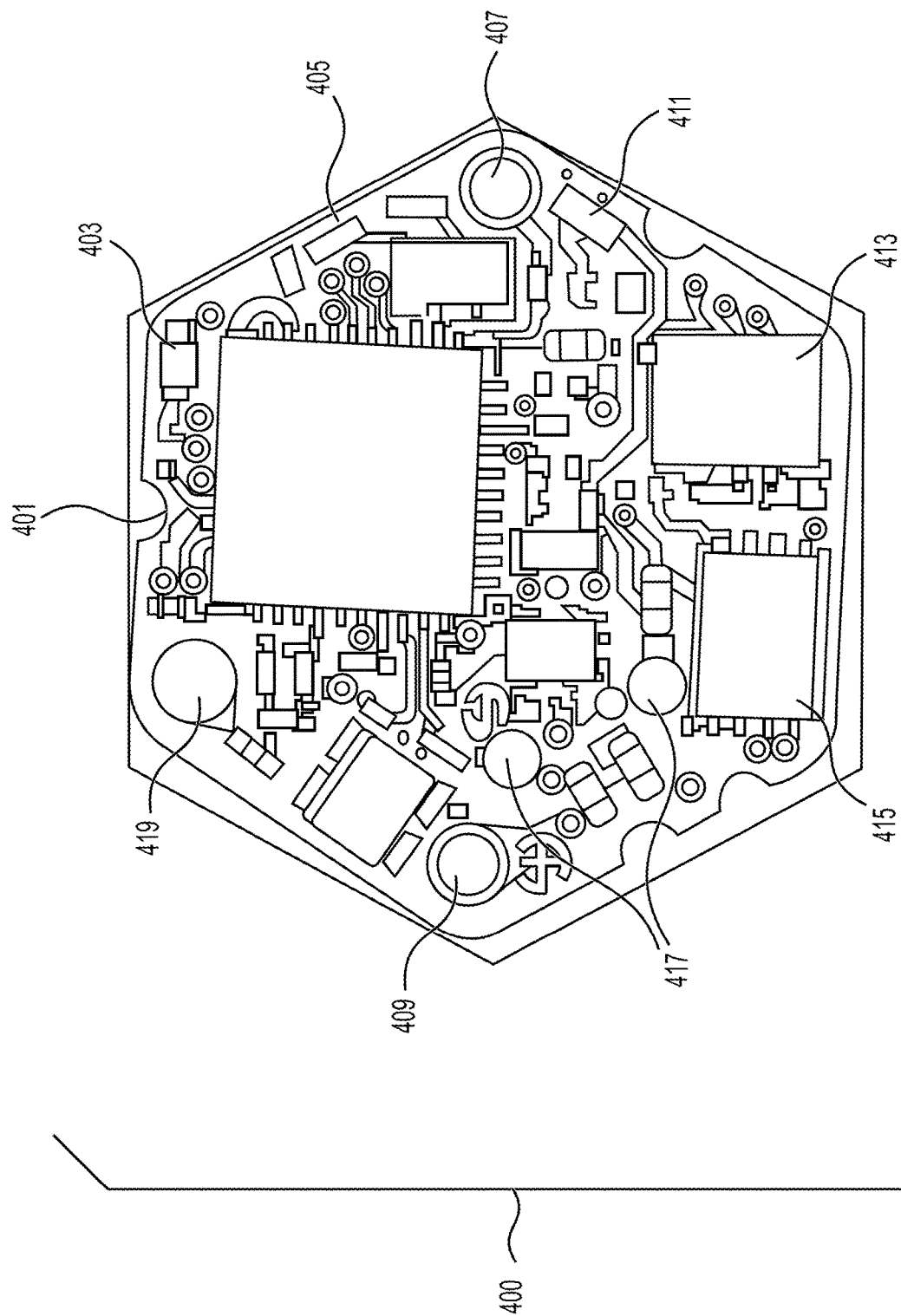
FIG. 4 shows a top view of a printed circuit board (PCB) of the exemplary peripheral unit, in accordance with one or more aspects of the present disclosure.

FIG. 4 shows a top view of PCB 303 of peripheral unit 113, in accordance with some aspects of the present disclosure. As depicted, PCB 303 may include locator holes 401, Bluetooth Low Energy (BLE) Light-emitting diode (LED) 403, crystal 405, ground hole 407, power hole 409, charging LED 411, IMU 413, charging integrated circuit (IC) 415, pads 417, and antenna pad 419. It is understood that configuration 400 is illustrative of at least one embodiment and PCB 303 may be formed in any other configuration per requirement.

In one embodiment, locator holes 401 may allow accurate positioning of PCB 303 in relation to other components. In one instance, locator holes 401 may be drilled in panels of PCB 303 to achieve high accuracy, however, it is understood that any other methods to form locator holes 401 may be implemented. For example, accurately locate PCB 303 to housing 300 or PCB 303 to a j-link pin programmer. The number, size, and placement of locator holes 401 are dependent on the requirement of PCB 303 and its components.

In one embodiment, BLE LED 403 may include a single LED or a plurality of LEDs, e.g., two, three, four, or more LEDs that are operably coupled to PCB 303. In one instance, the power stored in rechargeable battery 301 may cause BLE LED 403 to operate at various levels of intensity (e.g., low, medium, high, etc.), illumination patterns (e.g., flashing, pulsing, etc.), and colors. For example, BLE LED 403 may be configured to display information indicative of a connectivity status, wherein BLE LED 403 may blink in a fast pattern while trying to connect to a component/system or may blink in a slower pattern while connected. For example, BLE LED 403 may be configured to illuminate and/or display different colors indicative of said information.

In one embodiment, crystal 405 may include a quartz crystal element and an oscillation circuit using this crystal element. Crystal 405 may set the frequency of clocks used for high frequency and low frequency, and may transmit clock signals to corresponding layers of PCB 303. Crystal oscillator 405 may transmit very precise and stable frequencies which is important for high accuracy clocks and low power usage.

In one embodiment, ground hole 407 and power hole 409 are plated holes for attaching rechargeable battery 301 to PCB 303. In one instance, rechargeable battery 301 may be soldered via ground hole 407 and power hole 409 to PCB 303. It is to be understood that the number, size, and placement of ground hole 407 and power hole 409 may vary per requirement.

In one embodiment, Charging LED 411 may include a single LED or a plurality of LEDs, e.g., two, three, four, or more LEDs that are operably coupled to the charge circuit of PCB 303. In one instance, the power stored in rechargeable battery 301 may cause Charging LED 411 to operate at various levels of intensity (e.g., low, medium, high, etc.), illumination patterns (e.g., flashing, pulsing, etc.), and colors. For example, Charging LED 411 may be configured to display information indicative of a charge status, e.g., charging LED 411 may be configured to illuminate and/or display different colors at various levels of intensity to indicate the charge status.

In one embodiment, IMU 413 may measure and report the specific linear acceleration and angular velocity experienced in a local reference frame. IMU 413 may include a gyroscope, an accelerometer, a magnetometer, and/or any other suitable sensors. For example, the gyroscope may measure angular velocity around the x, y, and z axes in its local frame; the accelerometer may measure and report specific linear acceleration along the x, y, and z axes in its local frame; the magnetometer may measure the magnetic field surrounding the system, e.g., 9-axis IMU. In one example embodiment, IMU 413 may be Bosch® BMI 270 IMU with an accelerometer and gyroscope that is connected to Nordic® Semiconductor nRF52833 via a serial peripheral interface (SPI).

In one embodiment, charging IC 415 may control the power that is charging rechargeable battery 301 for the safety of PCB 303. In one example embodiment, charging IC 415 may set the power at a pre-determined threshold level, e.g., 30 milliampere (mA), to complete the charging of rechargeable battery 301 at a pre-determined time threshold, e.g., 2 hours.

In one embodiment, pads 417 may be configured to contact pogo pins 313, and pogo pins 313 may be soldered to pads 417. In one instance, electroless nickel immersion gold (ENIG) surface plating may be applied to pads 417 to protect from corrosion due to repeated assembly. ENIG surface plating may provide good oxidation resistance, excellent surface planarity, and may allow for easy soldering which may result in superior electrical performance of PCB 303.

In one embodiment, antenna pad 419 may be configured to contact Bluetooth antenna 315, and Bluetooth antenna 315 may be soldered to antenna pad 419. It is understood that any other methods to attach Bluetooth antenna 315 to antenna pad 419 may be implemented. In one example embodiment, antenna pad 419 may be positioned within close proximity to IC and may have a matching circuit.

Figure 5:
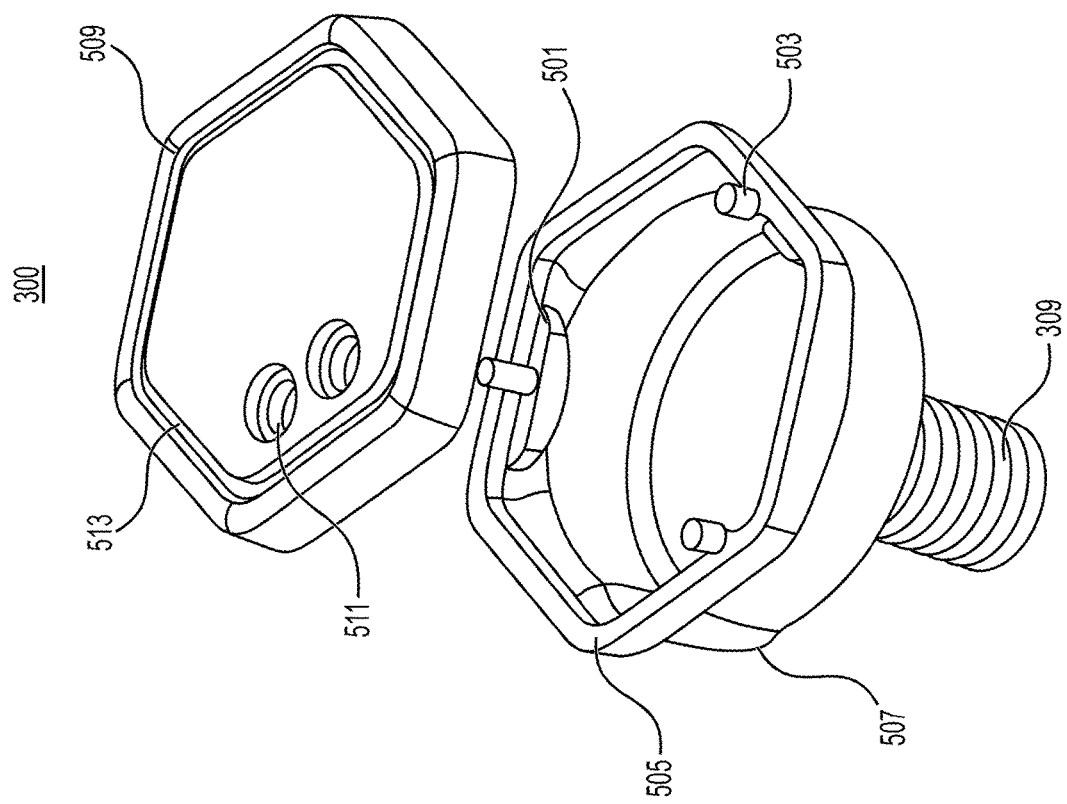
FIG. 5 illustrates an exploded view of a housing for an exemplary peripheral unit, according to one or more aspects of the present disclosure.

FIG. 5 illustrates an exploded view of housing 300, according to aspects of the present disclosure. Housing 300 may be formed of various suitable materials, including, for example, plastic. In one embodiment, housing bottom 305 may include PCB planes 501, locator pins 503, glue rib 505, and tab gap 507. It is understood that housing bottom 305 may be formed in any other configuration per requirement.

In one embodiment, PCB planes 501 may be sized and shaped to receive PCB 303, e.g., PCB planes 501 may have a flat configuration to accommodate PCB 303 during the assembly. PCB planes 501 may have various sizes and/or shapes relative to the size and shape of PCB 303. The connection or coupling of PCB planes 501 and PCB 303 must be accurate due to the importance on PCB 303 being a set distance from housing top 307.

In one embodiment, locator pins 503 may be tapered pins that are configured to accurately align PCB 303 to housing 300. Locator pins 503 may be designed to fit through the apertures in the surface of housing top 307 during the assembly of the various components of peripheral unit 113. In one instance, locator pins 503 may be a press-fit or a snap-fit, however, any other engagement mechanisms may be implemented.

In one embodiment, the outer diameter of housing bottom 305 may comprise glue rib 505, e.g., one or more depressions, recesses, and/or cavities, sized and shaped to receive an adhesive, e.g., glue, to form a glue channel, e.g., retaining up to 1 mm of glue. In one instance, the glue channel may attach housing bottom 305 to housing top 307, thereby providing a sufficiently air-tight sealing that prevents water from leaking into housing 300.

In one embodiment, tab gap 507 may be an aperture in the sidewalls of housing bottom 305 to accommodate a tab that runs alongside rechargeable battery 301. The shape and size of tab gap 507 may be configured based on dimension information of the tab that runs alongside rechargeable battery 301 and housing bottom 305. In one instance, tab gap 507 may allow orientation determination of housing bottom 305.

In one embodiment, housing top 307 may include antenna channel 509, pin holes 511, and antenna pass through 513, however, it is understood that housing top 307 may be formed in any other configuration per requirement. Antenna channel 509 may be an aperture, e.g., a swept cut, on the surface of housing top 307 through which Bluetooth antenna 315 may be bonded or glued to housing top 307. The shape, size, number, and placement of antenna channel 509 may be configured based on dimension information of Bluetooth antenna 315.

In one embodiment, pin holes 511 are a plurality of holes on the surface of housing top 307. The recharge pogo pins 313 may be pressed through pin holes 511. The shape, size, number, and placement of pin holes 511 may be adjusted based on the dimension information of recharge pogo pins 313 to provide an air-tight coupling to prevent any leakage. In one instance, adhesives may added around the coupling area of recharge pogo pins 313 and pin holes 511 per requirement.

In one embodiment, antenna pass through 513 may be an opening on the surface of housing top 307 for inserting the wire of Bluetooth antenna 315, and the inserted portion of the wire may be soldered to PCB 303 during assembly. The shape, size, number, and placement of antenna pass through 513 may be accommodated based on the dimension information of the wire of Bluetooth antenna 315.

Figure 6:
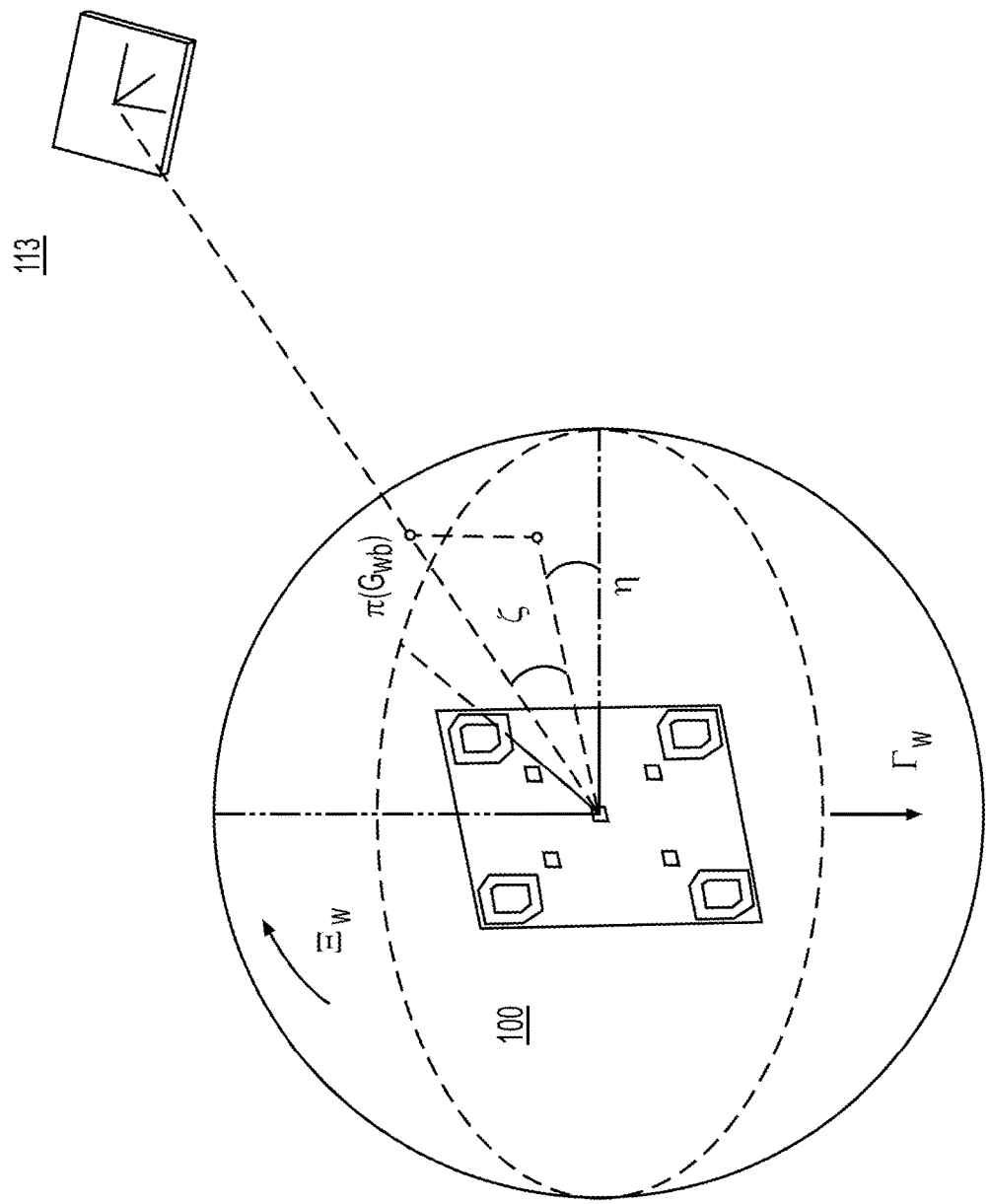
FIG. 6 depicts a calibration sequence for an exemplary peripheral unit, according to one or more aspects of the present disclosure.

As illustrated in FIG. 6, antenna array 101 may be a two-dimensional array of Bluetooth antennas configured to perform angle of arrival (AoA) measurements. In one instance, AoA measurements may be consistent with Bluetooth Core Specification 5.1. A portion of the signal emitted by peripheral unit 113 may be a CTE, which is an unwhitened signal representing a series of binary 1. In this manner, CTE waves emitted by antenna 117 may have an unmodulated frequency to provide a stable wavelength for AoA calculations.

Figure 8:
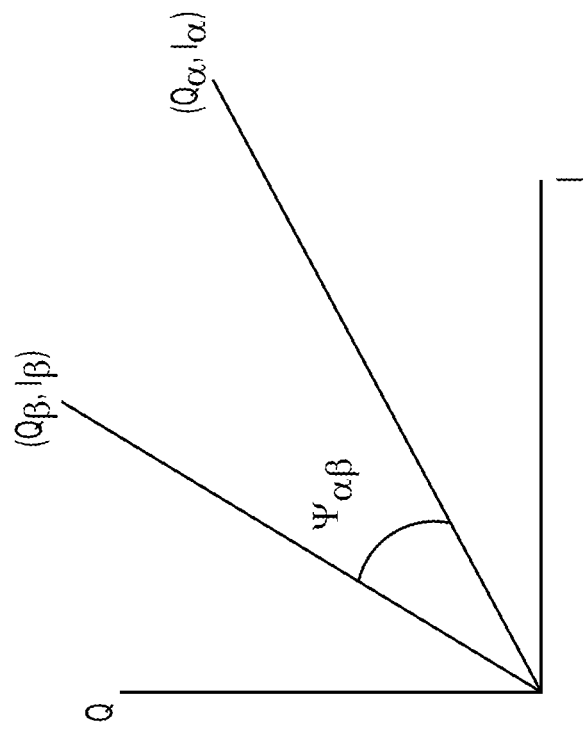
FIG. 8 illustrates IQ measurements of one or more antennas to define a relative phase, according to one or more aspects of the present disclosure.

In one instance, during CTE, central unit 100 may perform in-phase and quadrature (IQ) sampling on two or more antenna arrays 101, to provide a measurement of the amplitude (I) and phase (Q) of an incoming CTE signal, attributing each IQ sample to a specified antenna array 101p, which may result from a single IQ sampling sequence or result from filtering a number of such sequences. As illustrated in FIG. 8, measurements $(I_\alpha, Q_\alpha)$ and $(I_\beta, Q_\beta)$ associated with antenna array $101_\alpha$ and antenna array $101_\beta$ define a relative phase $(\psi_{\alpha\beta})$, which may be calculated as follows:

$$\Psi_{\alpha\beta} = \tan^{-1}\left(\frac{\frac{Q_\alpha}{I_\alpha} - \frac{Q_\beta}{I_\beta}}{1 + \frac{Q_\alpha Q_\beta}{I_\alpha I_\beta}}\right).$$

Figure 7:
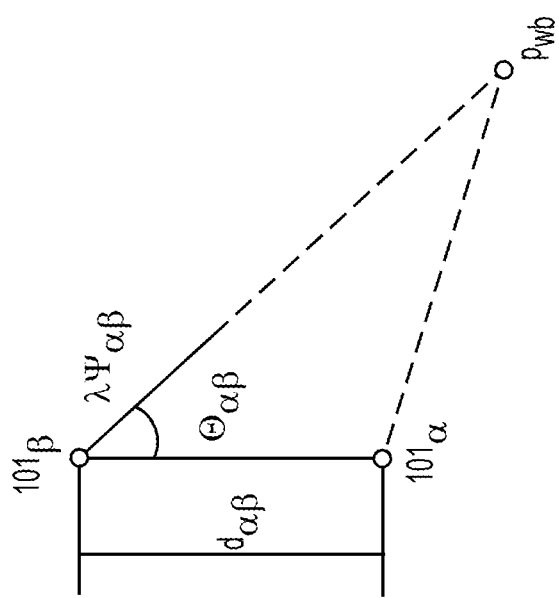
FIG. 7 illustrates antenna placements for determining the position or orientation of various frames, according to one or more aspects of the present disclosure.

As illustrated in FIG. 7, $\|p_{wb}\|$ is assumed to be sufficiently large relative to the distance between antenna array $101_\alpha$, $101_\beta$ such that an RF wave front propagating from antenna 117 may be approximated as a flat plane. The distance ($d_{\alpha,\beta}$) between antenna array $101_\alpha$ and antenna array $101_\beta$ is less than one-half the wavelength ($\lambda$) of the propagating wave to avoid aliasing, where $\lambda$ is approximately 12.5 cm for a Bluetooth signal. In this illustration, the configuration antenna array $101_\alpha$ is closer to antenna 117 than antenna array $101_\beta$, and the propagating wave travels approximately $\lambda\psi_{\alpha\beta}$ further to reach antenna array $101_\beta$. In one instance, angle $\Theta_{\alpha\beta}$ at $101_\beta$ between $v_{w(\eta_\alpha,\eta_\beta)}$ and $v_{w(d_\alpha,\eta_\beta)}$ can be calculated as:

$$\Theta_{\alpha\beta} = \cos^{-1}\left(\frac{\lambda\Psi_{\alpha\beta}}{2\pi d_{\alpha\beta}}\right).$$

Under this simplified plane model $\Theta_{\alpha\beta}$ is also the angle at antenna $101_\alpha$ between $v_{w(\eta_\beta, \eta_\alpha)}$ and $v_{w(d,\eta_\alpha)}$.

Figure 9:
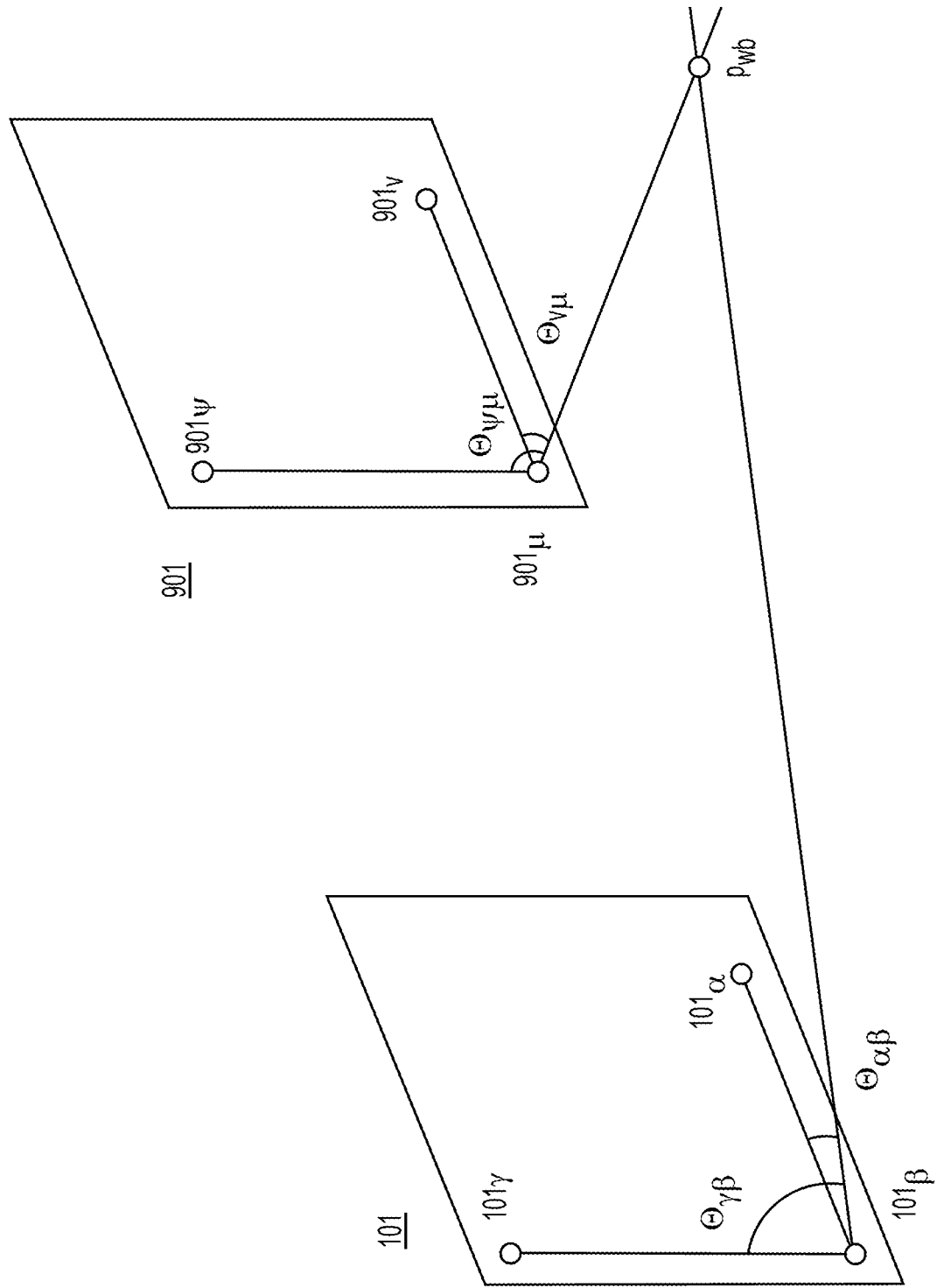
FIG. 9 illustrates a simplified planar model of antenna placements for determining the position or orientation of various frames, according to one or more aspects of the present disclosure.

In one instance, the determination of $\Theta_{\alpha\beta}$ is an estimate that $p_{wd}$ lies in a cone formed by all rays having a positive or zero component $v_{w(\eta_\beta, \eta_\alpha)}$ from $p_{w\eta_\beta}$ with angle $\Theta_{\alpha\beta}$ relative to $v_{w(\eta_\beta, \eta_\alpha)}$. As illustrated in FIG. 9, both antenna $101_\alpha$ and antenna $101_\gamma$ are also closer to antenna 117 than $101_\beta$. In a simplified planar model, if $v_{w(\eta_\gamma,\eta_\beta)}$ is not colinear with $v_{w(\eta_\alpha,\eta_\beta)}$, a determination of $\Theta_{\gamma\beta}$ localizes the estimate to two rays lying within the previous estimation cone. A selection of one of these two rays may be facilitated by inertial measurements, as discussed below, if the relevant area being tracked lies on both sides of the plane defined by antenna array 101. In the present embodiment, $v_{w(\eta_\alpha,\eta_\beta)}$ is orthogonal to $v_{w(\eta_\gamma,\eta_\beta)}$ and the origin of W lies within the parallelogram defined by $v_{w(\eta_\alpha,\eta_\beta)}$ and $v_{w(\eta_\gamma,\eta_\beta)}$ such that $\Theta_{\alpha\beta}$ and $\Theta_{\gamma\beta}$ can be interpreted as an azimuth ($\eta w$) and elevation ($\zeta_w$) in W. In this manner, selected ray defines projection $\pi(g_{wd})$, which is an estimate of the direction of D relative to W. More particularly, projection $\pi$ is a surjective map from SE(3) onto a unit 2-sphere:

$$\pi: SE(3) \to S^2, \pi(g_{wd}) \to (\eta_\alpha, \zeta_\gamma)$$

In an embodiment, $v_{w(\eta_\alpha,\eta_\beta)}$ is neither orthogonal nor colinear relative to $v_{w(\eta_\gamma,\eta_\beta)}$ and $\pi(g_{wd})$ is defined over a non-orthogonal basis. In another embodiment, propagating a wave emitted by antenna 117 is modeled as having non-planar wavefronts with a shape characterized prior to use. In this embodiment, a prior estimate of $g_{wd}$ is utilized to estimate the shape of the portion of the propagating wave in the proximity of antennas $101_\alpha$, $101_\beta$, and $101_\gamma$ to improve a determination of $\pi(g_{wd})$. In a further embodiment, a propagating wave emitted by antenna 117 is modeled as having spherical wavefronts and a prior estimate of $\|p_{wd}\|$ is utilized to improve a determination of $\pi(g_{wd})$.

In one embodiment, if antenna array 101 includes more than three antennas 10ρ multiple such projections may be used to improve a directional estimation of B relative to frames with fixed and pre-determined poses relative to W. In practice, signal reflections and other noise sources may complicate the simplified model described above. The various filtering, fusion and super-resolution algorithms known in the art, e.g., Multiple Signal Classification (MUSIC), propagator direct data acquisition (PDDA), estimation of signal parameters via a rotational invariance technique (ESPRIT), and/or subtracting signal subspace (SSS), may be applied to a number of IQ samples to provide an improved determination of $\pi(g_{wd})$ and similar directional estimates consistent with the principles of the simplified model.

In one instance, directional estimates from two frames with distinct origins may be used to determine $p_{wb}$. When the distance between two such origins is significantly smaller than $\|p_{wb}\|$ the determination of $p_{wb}$ may be sensitive to small errors in directional estimates. As illustrated in FIG. 9, a secondary antenna array 901, which defines frame y, includes a number of antennas $90_\chi$ and is configured such that the distance between antenna arrays 101 and 901 is larger than a distance between any two antennas $101_\rho$ and is larger than a distance between any two antennas $901_\chi$. In the disclosed embodiment $g_{wy}$ and $g_{wm_x}$ are fixed and determined prior to use. In one embodiment, secondary antenna array 901 may contain a radio, microprocessor, and/or RF switch to enable wireless communication with peripheral unit 113 and is in wired communication, via communication network 129, with central unit 100. In an alternate embodiment, a secondary central unit may include an IMU and $g_{wy}$ may be determined and updated dynamically.

As illustrated in FIG. 9, one or more antennas $901_\nu$, $901_\mu$, and $901_\varphi$ may define distinct reference frames $M_\nu$, $M_\mu$, and $M_\varphi$, respectively, with $g_{wm}$, $g_{wm_\mu}$, and $g_{wm_\varphi}$ fixed and determined prior to use. By employing a simplified planar model, RF wavefront propagating from antenna array 117 reaches the one or more antennas $901_\nu$, $901_\varphi$ prior to antenna $901_\mu$, and determination of $\Theta_{\nu\mu}$ and $\Theta_{\varphi\mu}$ proceed (as in the equation described above). In the illustrated embodiment, $v_{w(mm_\nu,m_\mu)}$ and $v_{w(m_\gamma,m_\mu)}$ are not collinear, and the origin of y lies within the parallelogram defined by $v_{w(m_\nu m_\mu)}$ and $v_{w(m_\varphi m_\alpha)}$ such that determination of $\Theta_{\nu\mu}$ and $\Theta_{\nu\mu}$ defines $\pi(g_{yd})$. In one instance, where rays defined by $\pi(g_{wd})$ and $\pi(g_{yd})$ intersect, this intersection localizes a determination of $p_{wd}$ and $p_{yd}$ to a single point. The presence of errors may generally cause such two rays to be skew with a unique line perpendicular to both rays, and the midpoint of the line segment between the two rays along such perpendicular line localizes a determination of $p_{wd}$ and $p_{yd}$ to a single point.

Within a given time interval, a set of determinations of $p_{wb}$ may be calculated depending on the number and arrangement of antennas $101_\rho$ and antennas $901_\chi$. This set of determinations of $p_{wd}$ and $p_{yd}$ may be averaged over, or more sophisticated filtering may be employed, to improve the estimation of $p_{wd}$ and $p_{yd}$.

Figure 10:
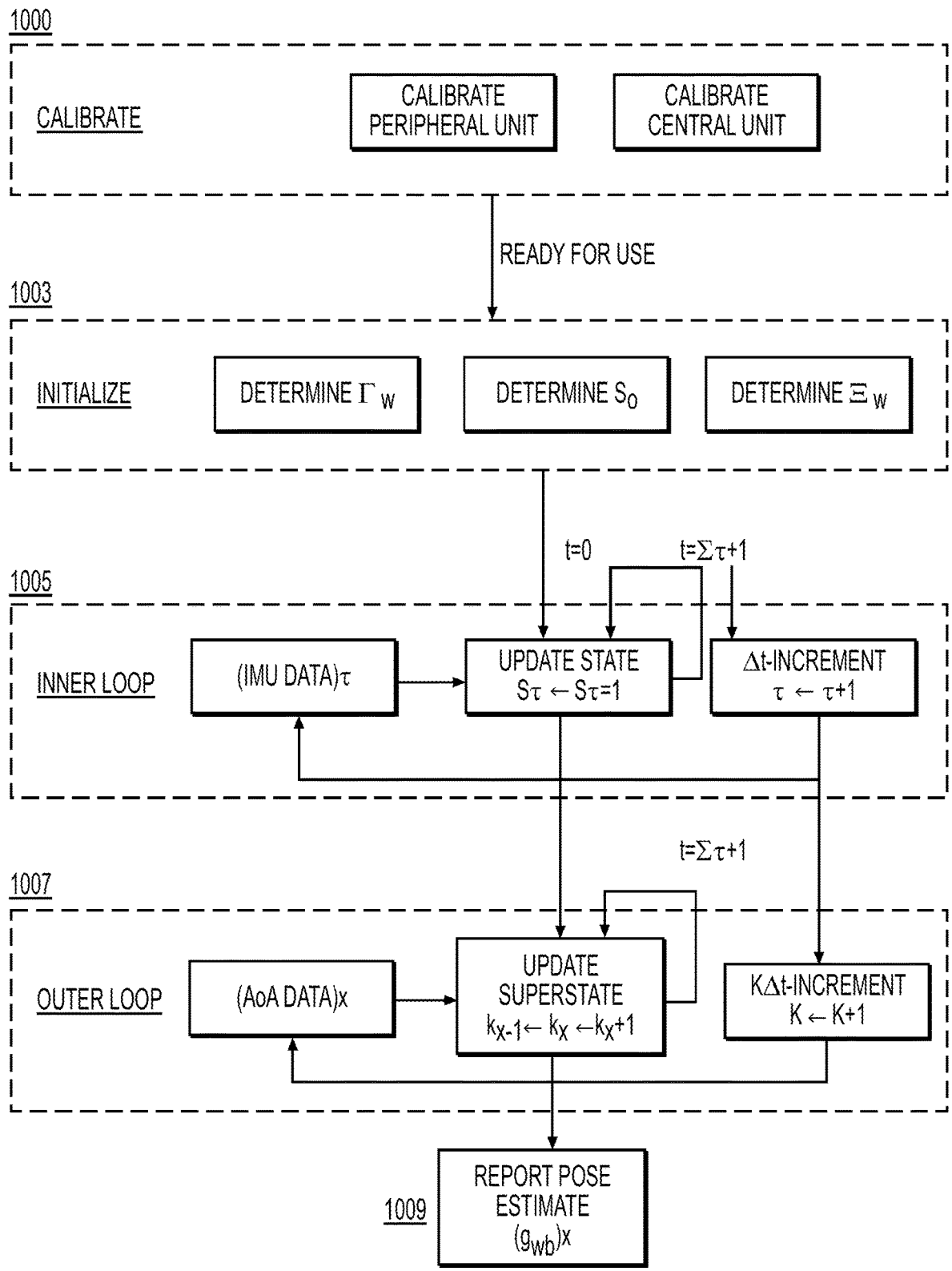
FIG. 10 illustrates an exemplary method for estimating a pose using an algorithm by calibrating and initializing an exemplary peripheral unit, according to one or more aspects of the present disclosure.

FIG. 10 depicts an exemplary method for algorithmically calibrating and initializing one or more signals to estimate a pose of an exemplary peripheral unit. As illustrated in FIG. 10, prior to use, peripheral unit 113 may undergo a calibration sequence (step 1000) to characterize IMU 115 sensitivity, bias, and/or zero-mean noise, to correct any non-orthogonality in IMU 115 axes, and to determine $g_{cb}$ and $g_{bd}$.

Prior to use, central unit 100 may also undergo a calibration sequence (step 1000) to characterize IMU 107 sensitivity, bias, and/or zero-mean noise, to correct for any non-orthogonality in IMU 107 axes, and to determine $g_{wt}$, $g_{wn_p}$, $g_{wy}$, and $g_{wm_x}$, as applicable. During calibration either one or both of central unit 100 and peripheral unit 113 may be involved in a sequence to determine $g_{tc}$. In an alternate embodiment, $g_{wt}=g_{wc}$.

In one instance, during use, an initialization step (step 1003) may begin with coupling the peripheral unit 113 to central unit 100 by attaching coupling feature 125 to mount 111. The coupling feature 125 and mount 111 may be configured, such that during attachment, B is in a fixed and pre-determined pose relative to W, which is $(g_{wb})_0$. The coupled peripheral unit 113 and central unit 100 may be maintained in a substantially stationary configuration relative to the Earth for the duration of initialization, and acceleration measured by IMU 115 may be used to define a vector representing acceleration due to gravity ($\Gamma_w \in R^3$) in W, which is taken to be constant after initialization, at least in the present embodiment. An angular velocity measured by IMU 107 during initialization may be used to define Earth's angular velocity ($\Xi_w \in so(3)$) in W. In another embodiment, a correlation between IMU 107 and IMU 115 may be utilized to distinguish $\Xi_w$ and $\Gamma_w$ from IMU 115 bias, and the data that is collected may be utilized to update IMU 115 bias parameters.

A system state (s.) is defined at time t=τ by:

$$S_T = \{(\omega_{wb}^w)_T, (\Omega_{wb})_T, (\alpha_{wb}^b)_T, (V_{wb}^w)_T, (P_{wb})_T\},$$

Wherein $\alpha_{wb}^b$ is a vector representing the linear acceleration of B relative to W as observed in B. To enable efficient calculations, $g_{wb}$ is represented in homogenous coordinates over GL(4, R) as:

$$g_{wb} = \begin{bmatrix} \Omega_{wb} & p_{wb} \\ 0 & 1 \end{bmatrix},$$

Wherein $V_{wb}^w$ is represented over gl(4, R) as $$V_{wb}^w = \begin{bmatrix} \omega_{wb}^w & v_{wb}^w \\ 0 & 0 \end{bmatrix}$$

An IMU 115 measurement $(m_r=[w_{wb}^b)_T, (\alpha_{wb}^b)_T]$ at time r provides a measurement indicating the value of these states during a time interval from $t-\Delta\tau=\Sigma-1$ to $t=\tau$ according to:

$$(V_{wb}^b)_\tau = \begin{bmatrix} (\omega_{wb}^b)_\tau & (v_{wb}^b)_{\tau-1} + \frac{1}{2}(a_{wb}^b)_\tau \Delta t \\ 0 & 0 \end{bmatrix}.$$

Transformation of $V_{wb}^b$ to $B_{wb}^w$ takes the from $Ad_{g_{wb}}(B_{wb}^b) = g_{wb}V_{wb}^b(g_{wb})^{-1} = V_{wb}^w$, which enables the use of a local measurement in B to inform a dead reckoning system state update for τ>0 according to (denoting $s_{t-1} \leftarrow s_t$, and employing a generalization of the midpoint rule for discrete integration):

$$(\omega_{wb}^w)_{\tau-1} \leftarrow (\omega_{wb}^w)_{\tau-1} + (\Omega_{wb})_{\tau-1}(a_{wb}^b)_\tau - \Xi_w,$$

$$(\Omega_{wb})_{\tau-1} \leftarrow \varepsilon^{\Delta t(\omega_{wb}^w)_\tau}(\Omega_{wb})_{\tau-1},$$

-continued $$(a_{wb}^b)_{\tau-1} \leftarrow (a_{wb}^b)_\tau - \left(\varepsilon^{\frac{\Delta t}{2}(\omega_{wb}^w)_\tau}(\Omega_{wb})_{\tau-1}\right)^T \Gamma_w,$$

$$(v_{wb}^w)_{\tau-1} \leftarrow$$

$$(v_{wb}^w)_{\tau-1} + \Delta t \varepsilon^{\frac{\Delta t}{2}(\omega_{wb}^w)_\tau}(\Omega_{wb})_{\tau-1}(a_{wb}^b)_\tau + ((p_{wb})_{\tau-1})^\wedge \varepsilon^{\frac{\Delta t}{2}(\omega_{wb}^w)_\tau}(\Omega_{wb})_{\tau-1}(\omega_{wb}^w)_\tau,$$

$$(p_{wb})_{\tau-1} \leftarrow (p_{wb})_{\tau-1} + (J_l)_\tau e^{\Delta t(v_{wb}^w)_\tau}.$$

Wherein $(p_{wb})$ is (denoting the $\chi^{th}$ component of $p_{wb}$ by $(p_{wb})_\chi$).

$$(p_{wb})^\wedge = \begin{bmatrix} 0 & -(p_{wb})_3 & (p_{wb})_2 \\ (p_{wb})_3 & 0 & -(p_{wb})_1 \\ -(p_{wb})_2 & (p_{wb})_1 & 0 \end{bmatrix}.$$

and $(J_l)$, is the left Jacobian of $\Omega_{wb}$ at t=τ given by (denoting the identity of GL(3, R) by I)

$$J_l = I + \frac{(\omega_{wb}^w)_\tau}{\|(\omega_{wb}^w)_\tau\|^2}(1 - \cos\|(\omega_{wb}^w)_\tau\|) + \frac{((\omega_{wb}^w)_\tau)^2}{\|(\omega_{wb}^w)_\tau\|^3}(\|(\omega_{wb}^w)_\tau\| - \sin\|(\omega_{wb}^w)_\tau\|).$$

In one embodiment, the system may include a plurality of secondary peripheral units, defining frames $H_\in$, configured in a manner substantially similar to peripheral unit 113. In this alternative embodiment B is associated with a virtual spatial frame, and virtual representations on interface unit 127 of $H_\in$ utilize $g_{bh\in}$. In applications that do not require a spatial frame stationary relative to Earth, and in which $\|p_{bhe}\|$ is smaller than $\|p_{wb}\|$, positively correlated errors in $g_{wb}$ and $g_{wh\in}$ may be reduced in $g_{bh\in}$.

In this manner at time r an estimate for $((p_{wb})_\tau)_{AoA}$ is available from AoA data independent of an estimate for $((g_{wb})_\tau)_{IMU}$ available from inertial measurement data. In the present embodiment $((p_{wb})_\tau)_{AoA}$ is updated after κ Δt intervals. Accordingly $s_{T-\kappa} \leftarrow \ldots \leftarrow s_{t-1} \leftarrow s_t$ are state updates (step 1005) based on data from $$\frac{k}{\Delta t}$$

inertial measurements in the form of an inner loop. In one embodiment, this inner loop is an extended Kalman filter or any variety of Kalman filter such as, e.g., an unscented Kalman filter. In the present embodiment, the number of Δt contained in each κ may vary. It should also be understood that Δt may vary with each IMU 115 measurements. In an alternative embodiment, Δt may be measured at each update and is an element of $s_t$.

Outer loop updates (step 1007) κ-superstate defined by:

$$k_k = [k, s_{T-k}, S_T, ((p_{wb})_\tau)_{AoA}, (b_{IMU})_\tau).$$

Wherein $(b_{IMU})_T$ may be a dynamically updated IMU 115 bias. The updated K-superstate is an output (step 1009) to interface unit 127. In an alternate embodiment, outer loop updates K-superstate defined by $k_K = (K, S_{T-k}, S_T, (\eta_w)_\tau, (\zeta_w)_\tau, (b_{IMU})_\tau)$.

Figure 11:
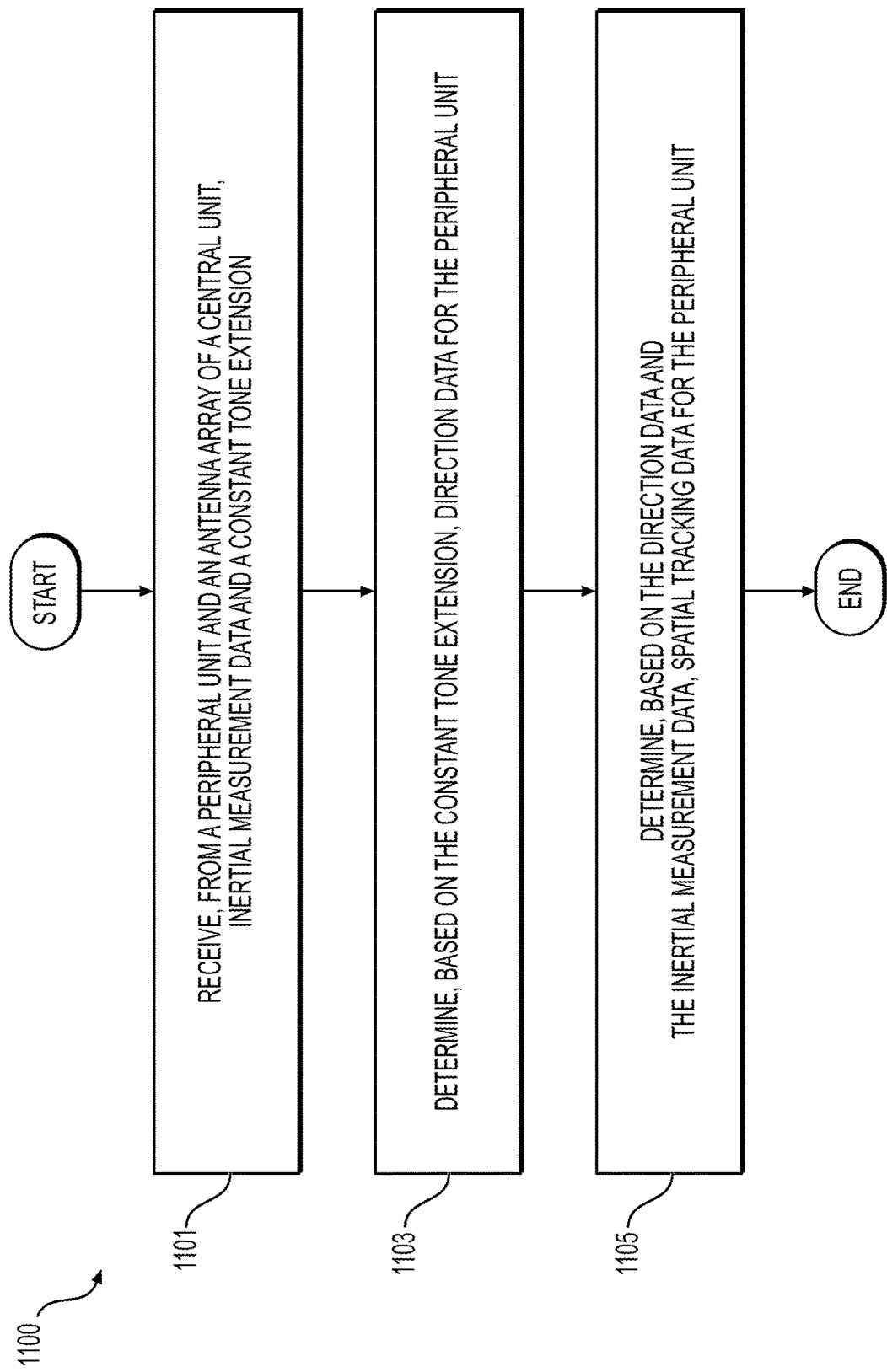
FIG. 11 is a flowchart of a process for spatial tracking using a hybrid signal, according to one or more aspects of the present disclosure.

FIG. 11 illustrates an exemplary process 1100 for spatial tracking using a hybrid signal, such as in the various examples discussed above. In various embodiments, computation platform 131 may perform one or more portions of process 1100 and may be implemented in, for instance, a chip set including a processor and a memory as shown in FIG. 12. Although process 1100 is illustrated and described as a sequence of steps, it is contemplated that various embodiments of process 1100 may be performed in any order or combination and need not include all of the illustrated steps.

At step 1101, computation platform 131 may periodically receive a plurality of signals from central unit 100 and peripheral unit 113. In one instance, computation platform 131 may receive inertial measurement data from IMU 115 of peripheral unit 113 and a CTE from radio 119 of peripheral unit 113. As described herein, IMU 115 of peripheral unit 113 may include, among other components, an accelerometer and a gyroscope. The inertial measurement data may include accelerometer data, gyroscope data, and additionally or optionally, other sensor data. In one instance, the inertial measurement data is an average of inertial measurements taken by the IMU 115 over a course of a period for the signal. In one instance, the inertial measurement data may represent an estimated pose of an object in a reference frame associated with peripheral unit 113.

At step 1103, computation platform 131 may determine, based on the CTE, direction data for peripheral unit 113. In one instance, determining the direction data for peripheral unit 113 may include IQ sampling of the CTE using a plurality of antennas of antenna array 101 of central unit 100. In one example embodiment, computation platform 131 may utilize angular phase-shifts that occur between antennas as they receive (AoA) or transmit (AoD) RF signals. With the use of antenna arrays at either side of the communication link, phase shift data may be determined and from this the location may be calculated. For example, AoA system features the antenna array on the receiver side, so that by measuring the phase-shift of the incoming signal, the receiver can determine the direction of the incoming signal. Whereas, AoD uses the antenna array to direct the transmitted signal at a given angle.

In one embodiment, computation platform 131 may perform IQ sampling to measure the phase of radio waves incident upon an antenna at a specific time. In the AoA approach, the sampling process may be applied to each antenna in the array, one at a time, and in some suitable sequence depending on the design of the array. To support IQ sampling and the use of IQ samples by higher layers in the stack, at the link layer, CTE is appended to the packet after the CRC. The purpose of the CTE field is to provide constant frequency and wavelength signal material against which IQ sampling is performed. This field contains a sequence of Is, is not subject to the usual whitening process and is not included in the CRC calculation.

At step 1105, computation platform 131 may determine, based on the direction data and the inertial measurement data, spatial tracking data for peripheral unit 113. In one instance, the spatial tracking data includes 6-axis estimation or position and orientation of peripheral unit 113. In one embodiment, computation platform 131 may determine the spatial tracking data for peripheral unit 113 in response to a disruption in an optical tracking associated with peripheral unit 113, wherein the disruption is one or more of interruption in the optical tracking, discontinuity in the optical tracking, jitter above a pre-determined threshold, or a combination thereof. Computation platform 131 may update, correct, re-calibrate, reorient, or a combination thereof the optical tracking based upon the determined spatial tracking data.

In one embodiment, computation platform 131 may utilize one or more algorithm to determine the spatial tracking data using the direction data and the inertial measurement data, such as the exemplary method discussed above with regard to FIG. 10.

In one embodiment, computation platform 131 may utilize a trained machine learning model to generate spatial tracking data. In one instance, the trained machine learning model may be trained using training data, e.g., initial data that may be used to develop a trained machine learning model, from which the model creates and refines its rules. Training data may be labeled, e.g., tagged to call out classifications or expected values the trained machine learning model is required to predict, or unlabeled so the model will have to extract features and assign clusters autonomously. In one instance, training data may include a training direction, training inertial measurement data, and training spatial data, that is representative of the sensory measurements of central unit 100 and peripheral unit 113. The training data trains or retrains the machine learning model to learn their relationships, and to generate the spatial tracking data in response to the input of the direction data and the inertial measurement data. Training the machine learning model may be an iterative process and may use a variety of optimization methods depending upon the chosen model.

Unlike algorithms that are rule-based, follow a set of instructions to accept input data and provide output, and do not rely on historical data, the trained machine learning model observe their training data with past observations to make predictions.

FIG. 12 is a simplified functional block diagram of a computer 1200 that may be configured as a device for executing the methods of FIG. 11, according to exemplary embodiments of the present disclosure. For example, computer 1200 may be configured as computation platform 131 and/or another system according to this disclosure. Any of the systems herein may be computer 1200 including, for example, data communication interface 1220 for packet data communication. Computer 1200 also may include a central processing unit ("CPU") 1202, in the form of one or more processors, for executing program instructions. Computer 1200 may include internal communication bus 1208, and storage unit 1206 (such as ROM, HDD, SDD, etc.) that may store data on computer readable medium 1222, although computer 1200 may receive programming and data via network communications. Computer 1200 may also have memory 1204 (such as RAM) storing instructions 1224 for executing techniques presented herein, although instructions 1224 may be stored temporarily or permanently within other modules of computer 1200 (e.g., processor 1202 and/or computer readable medium 1222). Computer 1200 may also include input and output ports 1212 and/or display 1210 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A computer-implemented method for spatial tracking using a hybrid signal, comprising:
   receiving, from a peripheral unit and via an antenna array of a central unit, a signal that includes:
      inertial measurement data from an inertial measurement unit (IMU) of the peripheral unit; and
      a constant tone extension (CTE);
   determining, based on the CTE, direction data for the peripheral unit; and
   determining, based on the direction data and the inertial measurement data, spatial tracking data for the peripheral unit in response to a disruption in an optical tracking associated with the peripheral unit.

2. The computer-implemented method of claim 1, wherein determining the direction data includes in-phase and quadrature (IQ) sampling of the CTE using a plurality of antennas of the antenna array of the central unit.

3. The computer-implemented method of claim 1, wherein the spatial tracking data includes 6-axis estimation data or position and orientation data for the peripheral unit.

4. The computer-implemented method of claim 1, wherein the signal is received periodically.

5. The computer-implemented method of claim 4, wherein the inertial measurement data is an average of inertial measurements taken by the IMU over a course of a period for the signal.

6. The computer-implemented method of claim 1, further comprising:
   using a trained machine learning model to generate the spatial tracking data, wherein the trained machine learning model has been trained, using a training direction, training inertial measurement data, and training spatial data, to learn relationships therebetween, such that the trained machine learning model is trained to generate the spatial tracking data in response to input of the direction data and the inertial measurement data.

7. The computer-implemented method of claim 1, further comprising:
   updating, correcting, re-calibrating, reorienting, or a combination thereof the optical tracking based upon the determined spatial tracking data.

8. The computer-implemented method of claim 1, wherein the disruption is one or more of interruption in the optical tracking, discontinuity in the optical tracking, jitter above a pre-determined threshold, or a combination thereof.

9. A system for spatial tracking using a hybrid signal, comprising:
   at least one memory storing instructions; and
   one or more processors operatively connected with the at least one memory, and configured to execute the instructions to perform operations, including:
      receiving, from a peripheral unit and via an antenna array of a central unit, a signal that includes:
         inertial measurement data from an inertial measurement unit (IMU) of the peripheral unit; and
         a constant tone extension (CTE);
      determining, based on the CTE, direction data for the peripheral unit; and
      determining, based on the direction data and the inertial measurement data, spatial tracking data for the peripheral unit in response to a disruption in an optical tracking associated with the peripheral unit.

10. The system of claim 9, wherein the peripheral unit includes an antenna, a Bluetooth Low Energy (BLE) radio, and a microcontroller configured to process and transmit the signal to the central unit.

11. The system of claim 10, wherein the microcontroller is in communication with the IMU via an inter-integrated circuit bus or a serial peripheral interface (SPI) bus.

12. The system of claim 9, further comprising:
   at least one secondary peripheral unit with a same configuration as the peripheral unit.

13. The system of claim 9, wherein the operations further include:
   detecting the disruption in the optical tracking of the peripheral unit by an optical tracking device; and
   updating, correcting, re-calibrating, reorienting, or a combination thereof optical tracking data based upon the determined spatial tracking data.

14. The system of claim 12, wherein the peripheral unit, the at least one secondary peripheral unit, or a combination thereof are configured to couple with an object to be spatially tracked.

15. The system of claim 9, further comprising:
   an interface unit including:
      at least one memory storing instructions; and
      one or more processors operatively connected with the at least one memory, and configured to execute the instructions to perform operations, including:
         updating or correcting a virtual position of an element rendered by the interface unit based upon the spatial tracking data.

16. The system of claim 9, wherein the memory further includes a trained machine learning model, wherein the operations further includes:
   using the trained machine learning model to generate the spatial tracking data, wherein the trained machine learning model has been trained, using a training direction, training inertial measurement data, and training spatial data, to learn relationships therebetween, such that the trained machine learning model is trained to generate the spatial tracking data in response to input of the direction data and the inertial measurement data.

17. A non-transitory computer-readable storage medium for spatial tracking using a hybrid signal, carrying one or more sequences of one or more instructions which, when executed by one or more processors, cause an apparatus to at least perform operations that include:
   receiving, from a peripheral unit and via an antenna array of a central unit, a signal that includes:
      inertial measurement data from an inertial measurement unit (IMU) of the peripheral unit; and
      a constant tone extension (CTE);
   determining, based on CTE, direction data for the peripheral unit; and
   determining, based on the direction data and the inertial measurement data, spatial tracking data for the peripheral unit in response to a disruption in an optical tracking associated with the peripheral unit.

18. The non-transitory computer-readable storage medium of claim 17, the operations further including:
   determining the direction data includes in-phase and quadrature (IQ) sampling of the CTE using a plurality of antennas of the antenna array of the central unit.

19. The non-transitory computer-readable storage medium of claim 17, wherein the spatial tracking data includes 6-axis estimation data or position and orientation data of the peripheral unit.

* * * * *